US011835948B2

(12) United States Patent
Trumpore et al.

(10) Patent No.: US 11,835,948 B2
(45) Date of Patent: Dec. 5, 2023

(54) SYSTEMS AND METHODS FOR IMPROVING VEHICLE OPERATIONS USING MOVABLE SENSORS

(71) Applicant: Motional AD LLC, Boston, MA (US)

(72) Inventors: Ryan Trumpore, Pittsburgh, PA (US); Theodore Alden, Pittsburgh, PA (US); Grigoriy Dubrovskiy, Pittsburgh, PA (US); Sachit Kaul, Pittsburgh, PA (US); Manuel Weiss, Aspinwall, PA (US); Sai Sonti, Pittsburgh, PA (US); Nicholas Merritt, Mars, PA (US); Meshari Alhemaidi, Pittsburgh, PA (US); Bing Han, Pittsburgh, PA (US); Priyanka Ashok, Monroeville, PA (US); Katherine Colwell, Pittsburgh, PA (US); Jeong Hwan Jeon, Somerville, MA (US); Jonathan L. Wieskamp, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 196 days.

(21) Appl. No.: 16/668,475

(22) Filed: Oct. 30, 2019

(65) Prior Publication Data
US 2020/0174469 A1 Jun. 4, 2020

Related U.S. Application Data

(60) Provisional application No. 62/774,685, filed on Dec. 3, 2018.

(51) Int. Cl.
G05D 1/00 (2006.01)
G05D 1/02 (2020.01)
(Continued)

(52) U.S. Cl.
CPC ......... *G05D 1/0033* (2013.01); *B64C 39/022* (2013.01); *B64C 39/024* (2013.01);
(Continued)

(58) Field of Classification Search
CPC .. G05D 1/0033; G05D 1/0094; G05D 1/0248; G05D 1/0278; B64C 39/022;
(Continued)

(56) References Cited

U.S. PATENT DOCUMENTS 5,128,874 A 7/1992 Bhanu et al.
10,025,311 B2 7/2018 Lambermont et al.
(Continued)

FOREIGN PATENT DOCUMENTS

DE 102014226458 6/2016
DE 102015207979 11/2016
(Continued)

OTHER PUBLICATIONS

Machine Translation: WO-2008040593-A1 (year:2008).*
(Continued)

*Primary Examiner* — Anne Marie Antonucci
*Assistant Examiner* — Connor L Knight
(74) *Attorney, Agent, or Firm* — Fish & Richardson P.C.

(57) ABSTRACT

Among other things, we describe systems and method for improving vehicle operations using movable sensors. A vehicle can be configured with one or more sensors having the capability to be extended and/or rotated. The one or more movable sensors can be caused to move based on a determined context of the vehicle, to capture additional data associated with the environment in which the vehicle is operating.

20 Claims, 17 Drawing Sheets

(51) Int. Cl.
*G01S 7/00* (2006.01)
*B64C 39/02* (2023.01)
*G01S 17/02* (2020.01)
*G01S 17/86* (2020.01)
*B64U 10/13* (2023.01)

(52) U.S. Cl.
CPC .............. *G01S 7/006* (2013.01); *G01S 17/86* (2020.01); *G05D 1/0094* (2013.01); *G05D 1/0248* (2013.01); *G05D 1/0278* (2013.01); *B64U 10/13* (2023.01); *B64U 2201/202* (2023.01)

(58) Field of Classification Search
CPC .......... B64C 39/024; B64C 2201/027; B64C 2201/148; B64C 2201/123; B64C 2201/208; G01S 7/006; G01S 17/86; G01S 13/862; G01S 13/865; G01S 13/867; G01S 15/931; G01S 2013/9315; G01S 2013/932; G01S 2013/9323; G01S 2013/9324; G01S 2013/9327; G01S 2015/937; G01S 2013/9316; G01S 17/931; G01S 7/003; G01S 7/40; G01S 7/497; G01S 13/86; G01S 13/931; G08G 1/09623; G08G 1/096725; G08G 1/09675; G08G 1/096791; G08G 1/163; G08G 1/167; B60W 40/02; B60W 30/18154; B60W 30/18159; B60W 60/001; B60W 2050/0005; B60W 2420/00; B60W 2552/53; B60W 2556/45; B60R 11/00; B60Y 2300/18158; B60Y 2400/30
See application file for complete search history.

(56) References Cited

U.S. PATENT DOCUMENTS

| | | | |
|---|---|---|---|
| 10,336,343 | B1* | 7/2019 | Fiedler .................. B60W 40/10 |
| 10,488,493 | B2* | 11/2019 | Nguyen ................ G01S 17/931 |
| 2013/0335569 | A1 | 12/2013 | Einecke et al. |
| 2014/0336935 | A1 | 11/2014 | Zhu et al. |
| 2015/0175088 | A1* | 6/2015 | Chang ................ H04N 5/23293 348/148 |
| 2016/0016663 | A1* | 1/2016 | Stanek ................. G05D 1/0094 701/3 |
| 2017/0357270 | A1* | 12/2017 | Russell ............... G05D 1/0242 |
| 2018/0039273 | A1* | 2/2018 | Delp ...................... B60W 50/14 |
| 2018/0061148 | A1 | 3/2018 | Dudar et al. |
| 2018/0173222 | A1 | 6/2018 | Tseng et al. |
| 2019/0107843 | A1* | 4/2019 | Dede ........................ B60L 53/12 |
| 2019/0265736 | A1* | 8/2019 | Goto .................. G06K 9/00791 |
| 2019/0384276 | A1* | 12/2019 | Wang ..................... G01C 21/20 |
| 2020/0050201 | A1* | 2/2020 | Yu ........................ G06K 9/00791 |
| 2021/0390867 | A1* | 12/2021 | Kim ...................... B64C 39/024 |

FOREIGN PATENT DOCUMENTS

| | | | | |
|---|---|---|---|---|
| EP | 2769238 | | 2/2018 | |
| FR | 2986647 | | 8/2013 | |
| JP | 2016-138853 | | 8/2016 | |
| KR | 20180065760 | A * | 6/2018 | |
| WO | WO-2008040593 | A1 * | 4/2008 | .......... G01S 13/931 |
| WO | WO 2013059552 | | 4/2013 | |
| WO | WO 2018045354 | | 3/2018 | |
| WO | WO 2018196001 | | 11/2018 | |

OTHER PUBLICATIONS

Machine Translation: KR-20180065760-A (year:2018).*
PCT International Search Report and Written Opinion in International Appln. No. PCT/US2019/063741, dated Apr. 2, 2020, 14 pages.
PCT International Preliminary Report on Patentability in International Appln. No. PCT/US2019/063741, dated Jun. 8, 2021, 7 pages.
[No Author Listed], "J3016: Taxonomy and Definitions for Terms Related to Driving Automation Systems for On-Road Motor Vehicles" SAE International, Sep. 2016, 30 pages.
fastcompany.com' [online]. "Why Your Autonomous Car Might Come With Its Own Drone," Published on May 2, 2018, [retrieved on Oct. 20, 2018], retrieved from the Internet: URL:<https://www.fastcompany.com/90162582/why-your-autonomous-car-might-come-with-its-own-drone>,7 pages.
Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
U.S. Appl. No. 16/006,950, filed Jun. 13, 2018, Wang.

* cited by examiner

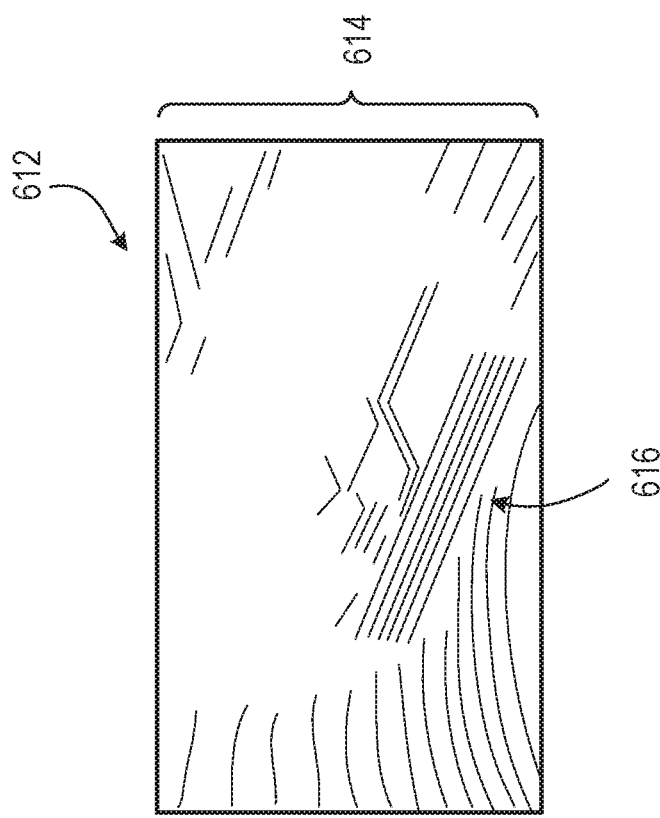
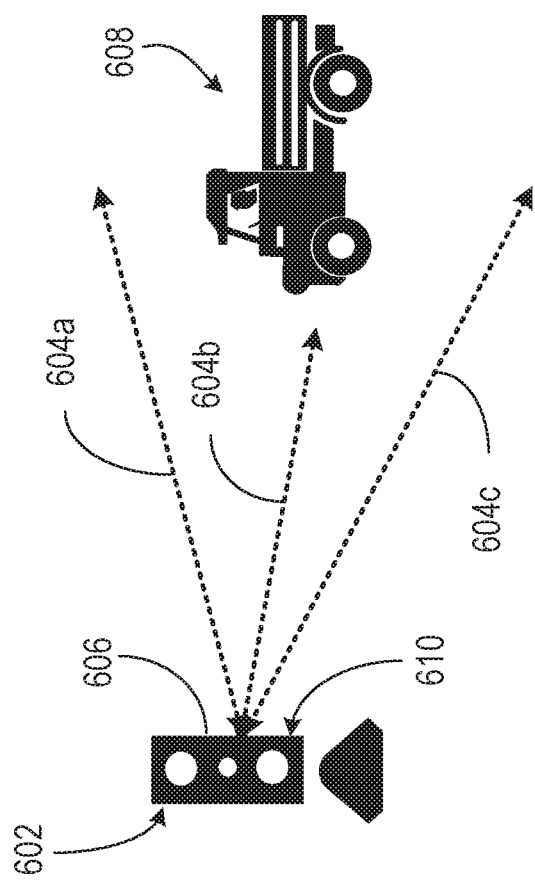
FIG. 6

SYSTEMS AND METHODS FOR IMPROVING VEHICLE OPERATIONS USING MOVABLE SENSORS

CROSS-REFERENCE TO RELATED APPLICATIONS

This application is related to U.S. patent application Ser. No. 16/006,950, filed on Jun. 13, 2018, and claims the benefit of U.S. Provisional Application 62/774,685, filed on Dec. 3, 2018, both of which are incorporated herein by reference in their entirety.

FIELD OF THE INVENTION

This disclosure generally relates to movable sensors. In particular, this description relates to systems and methods for improving the vehicle operations of vehicles having stationary sensors by using movable sensors.

BACKGROUND

It is becoming popular to configure vehicles such that they have autonomous navigation capabilities. For example, drones and self-driving cars can be configured to autonomously navigate throughout an environment. These vehicles may rely on sensors such as light detection and ranging sensors, RADAR, and vision based sensors to assist them in navigating within an environment. Many of these autonomous vehicles use multiple sensor types simultaneously. Typically, these sensors are mounted on the autonomous vehicle in a fixed position.

SUMMARY

In at least one aspect of the present disclosure, a vehicle is provided. The vehicle includes a plurality of sensors. The plurality of sensors include at least one movable sensor configured to move in at least one direction and capture sensor data. The vehicle also includes a computer-readable medium comprising computer-executable instructions and at least one processor communicatively coupled to the plurality of sensors, including the at least one movable sensor. The at least one processor is configured to execute the computer-executable instructions to: receive data associated with an environment in which the vehicle is operating; determine, based on the received data, a context of the vehicle; determine, based on the context of the vehicle, that additional data is to be captured; determine if the at least one movable sensor is capable of capturing the additional data based on a current mechanical configuration of the at least one movable sensor; and cause, based on a determination that the at least one movable sensor is unable to capture the additional data in the current mechanical configuration, the at least one movable sensor to move in a direction such that the at least one movable sensor is able to capture the additional data.

The at least one movable sensor can be mounted on an aerial platform. The aerial platform can be geographically tethered to the vehicle. The at least one processor, when executing the computer-executable instructions, can further configured to carry out operations to transmit sensor data captured by the at least one movable sensor to at least one remote vehicle system. The received data can be geographical data from a global positioning system.

When the vehicle is traversing a road and the received data indicates that the vehicle is approaching at least one turn in the road, the at least one processor can be configured to carry out operations to cause the at least one movable sensor to move in a direction such that the at least one movable sensor is capable of capturing sensor data at locations that are distinct from a location of the at least one turn in the road. When the received data indicates that the vehicle is traversing a highway onramp, the at least one processor can configured to carry out operations to cause the at least one movable sensor to move in a direction such that the at least one movable sensor is capable of capturing sensor data at locations opposite the vehicle's direction of traverse. When the received data is object detection data from at least one sensor of the plurality of sensors indicating that the at least one sensor has an at least partially occluded field of view, the at least one processor can be configured to carry out operations to cause the at least one movable sensor to move in a direction such that the at least one movable sensor is capable of capturing sensor data beyond the at least partially occluded field of view. When the received data indicates that road traffic proximate to the vehicle is at a traffic level exceeding a predetermined traffic threshold, the at least one processor can be configured to carry out operations to cause the at least one movable sensor to move in a direction such that the at least one movable sensor is capable of capturing sensor data of at least one blind spot of the vehicle.

When executing the computer-executable instructions, that at least one processor can be configured to further carry out operations to: determine if at least one sensor of the plurality of sensors is capable of capturing the additional data based on an electronic configuration of the at least one sensor; and adjust, based on a determination that the at least one sensor is unable to capture the additional data in the current electronic configuration, an electronic function of the at least one sensor such that the at least one sensor is able to capture the additional data. When executing the computer-executable instructions, the at least one processor can further carry out operations to: receive operational data associated with at least one sensor of the plurality of sensors; and cause, based on the received operational data, the at least one movable sensor to move in a direction. When the operational data indicates that the at least one sensor is experiencing a failure condition, the at least one processor can be configured to carry out operations to cause the at least one movable sensor to move in a direction such that the at least one movable sensor is capable of capturing sensor data of a field of view of the at least one sensor.

Causing the at least one movable sensor to move can include causing the at least one movable sensor to extend in a direction, rotate in a direction about an axis of rotation, or both. Determining that additional data is to be captured can include determining a probability that additional data useful for vehicle navigation purposes is available in an orientation outside a current view of the at least one movable sensor.

In another aspect of the present disclosure, a method is provided. The method includes receiving data associated with an environment in which a vehicle is operating, the vehicle including a plurality of sensors, the plurality of sensors including at least one movable sensor configured to move in at least one direction. The method includes determining, based on the received data, a context of the vehicle. The method includes determining, based on the context of the vehicle, that additional data is to be captured. The method includes determining if the at least one movable sensor is capable of capturing the additional data based on a current mechanical configuration of the at least one movable sensor. The method includes causing, based on a determination that the at least one movable sensor is unable to capture the additional data in the current mechanical configuration, the at least one movable sensor to move in at least one direction such that the at least one movable sensor is able to capture the additional data.

The movable sensor can be mounted on an aerial platform. The method can include geographically tethering the aerial platform to the vehicle. The method can include transmitting sensor data captured by the at least one movable sensor to at least one remote vehicle system. The received data can be geographical data from a global positioning system.

The received data can indicate that the vehicle is approaching at least one turn in a road that the vehicle is traversing. The method can include causing the at least one movable sensor move in at least one direction such that the at least one movable sensor is capable of capturing sensor data at locations that are distinct from a location of the at least one turn in the road. The received data can indicate that the vehicle is traversing an interstate onramp. The method can include causing the at least one movable sensor to move in at least one direction such that the at least one movable sensor is capable of capturing sensor data at locations opposite the vehicle's direction of traverse. The received data can object detection data from at least one sensor of the plurality of sensors indicating that the at least one sensor has an at least partially occluded field of view. The method can include causing the at least one movable sensor to move in at least one direction such that the at least one sensor is capable of capturing sensor data beyond the at least partially occluded field of view. The received data can indicate a high level of road traffic proximate to the vehicle. The method can include causing the at least one movable sensor to move in at least one direction such that the at least one movable sensor is capable of capturing sensor data of at least one blind spot of the vehicle.

The method can include determining if at least one sensor of the plurality of sensors is able to capture the additional data based on a current electronic configuration of the at least one sensor. The method can include adjusting, based on a determination that the at least one sensor is unable to capture the additional data in the current electronic configuration, an electronic function of the at least one sensor such that the at least one movable sensor is able to capture the additional data. The method can include receiving operational data associated with at least one sensor of the plurality of sensors. The method can include causing, based on the received operational data, the at least one movable sensor to move in at least one direction. The operational data can indicate that the at least one sensor is experiencing a failure condition. The method can include causing the at least one movable sensor to move in at least one direction such that the at least one movable sensor is capable of capturing sensor data of a field of view of the at least one sensor.

Causing the at least one movable sensor to move can include causing the at least one movable sensor to extend in a direction, rotate in a direction about an axis of rotation, or both. Determining that additional data is to be captured comprises determining a probability that additional data useful for vehicle navigation purposes is available in an orientation outside a current view of the at least one movable sensor.

In another aspect of the present disclosure, one or more non-transitory storage media storing instructions is provided which, when executed by one or more computing devices, cause performance of any one of the aforementioned methods.

BRIEF DESCRIPTION OF THE DRAWINGS

FIG. 6 shows an example of a LiDAR system.

DETAILED DESCRIPTION

Figure 1:
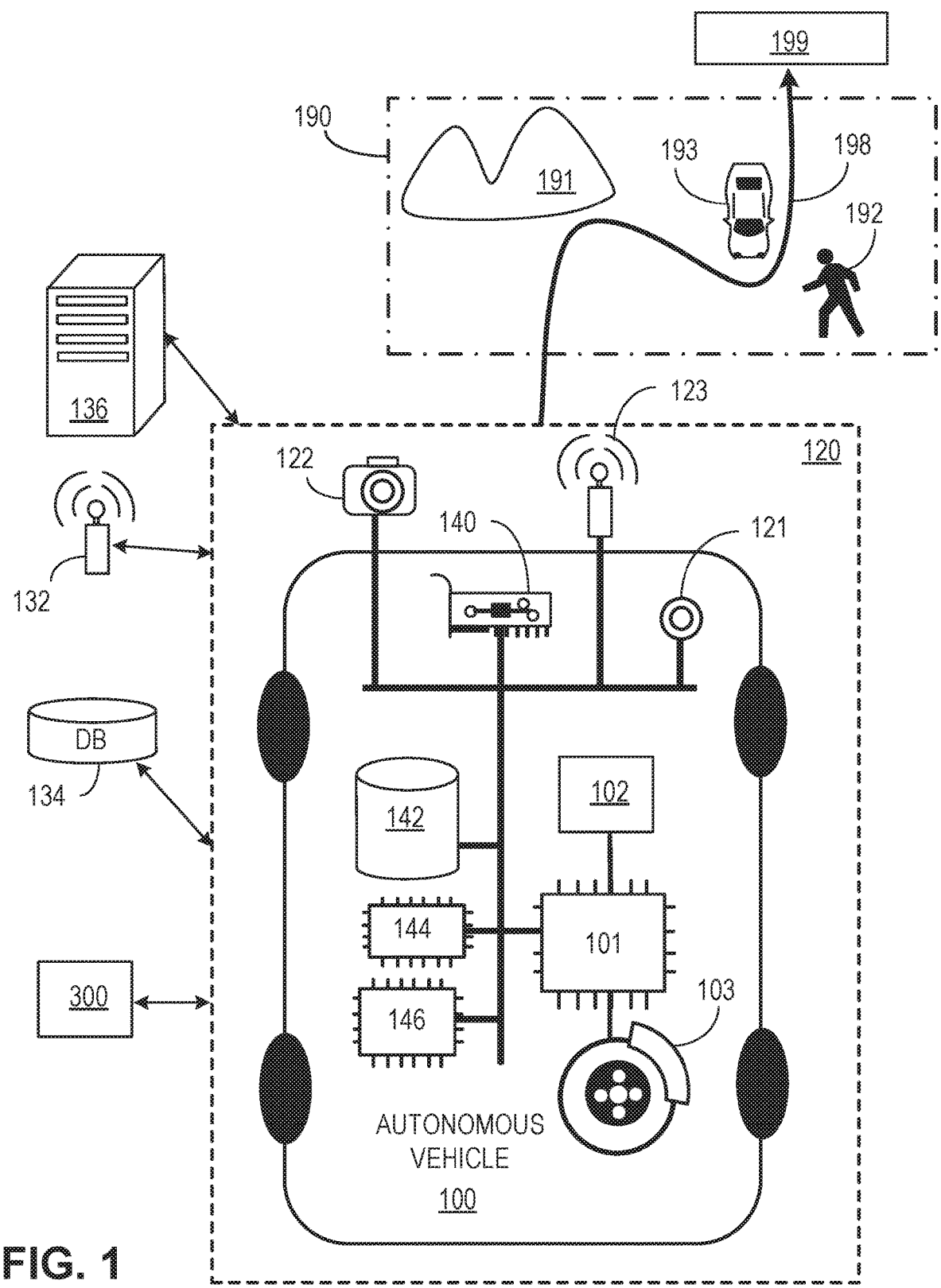
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Systems and Methods for Improving Vehicle Operations Using Movable Sensors General Overview Among other things, this disclosure describes techniques for improving vehicle operations using movable sensors. The movable sensors can improve the vehicle operations by facilitating the capture of more information related to the environment in which the vehicle is operating as compared with other vehicle systems that are limited by fixed sensors that are not configured for dynamic movement. The systems and methods make use of one or more sensors and/or other navigation enabling devices (e.g., global positioning systems) to determine when the movable sensor should be operated.

It is becoming popular to configure vehicles such that they have autonomous navigation capabilities. For example, drones and self-driving cars can be configured to autonomously navigate throughout an environment. These vehicles may rely on sensors such as light detection and ranging sensors, RADAR, and vision based sensors to assist them in navigating within an environment. Many of these autonomous vehicles use multiple sensor types simultaneously. Typically, these sensors are mounted on the autonomous vehicle in fixed positions.

Because these sensors are typically mounted in a fixed position, the collective field of view (FOV) of these sensors may be limited. Consequently, road conditions and/or traffic conditions proximate to the vehicle may obstruct the FOVs associated with the sensors. For example, when the vehicle approaches a T-intersection in a road, the fixed sensors may not be able to capture information at locations beyond the turns of the T-intersection, such as whether or not other cars and/or pedestrians are approaching. Obstructions that limit the fields of view of the static sensors can be detrimental to the safety of the vehicle and other vehicles/pedestrians proximate to the vehicle. Thus, it may be desirable to use one or more movable sensors to increase the vehicles ability to obtain information about its surrounding environment.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including, without limitation, fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any level, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates, or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
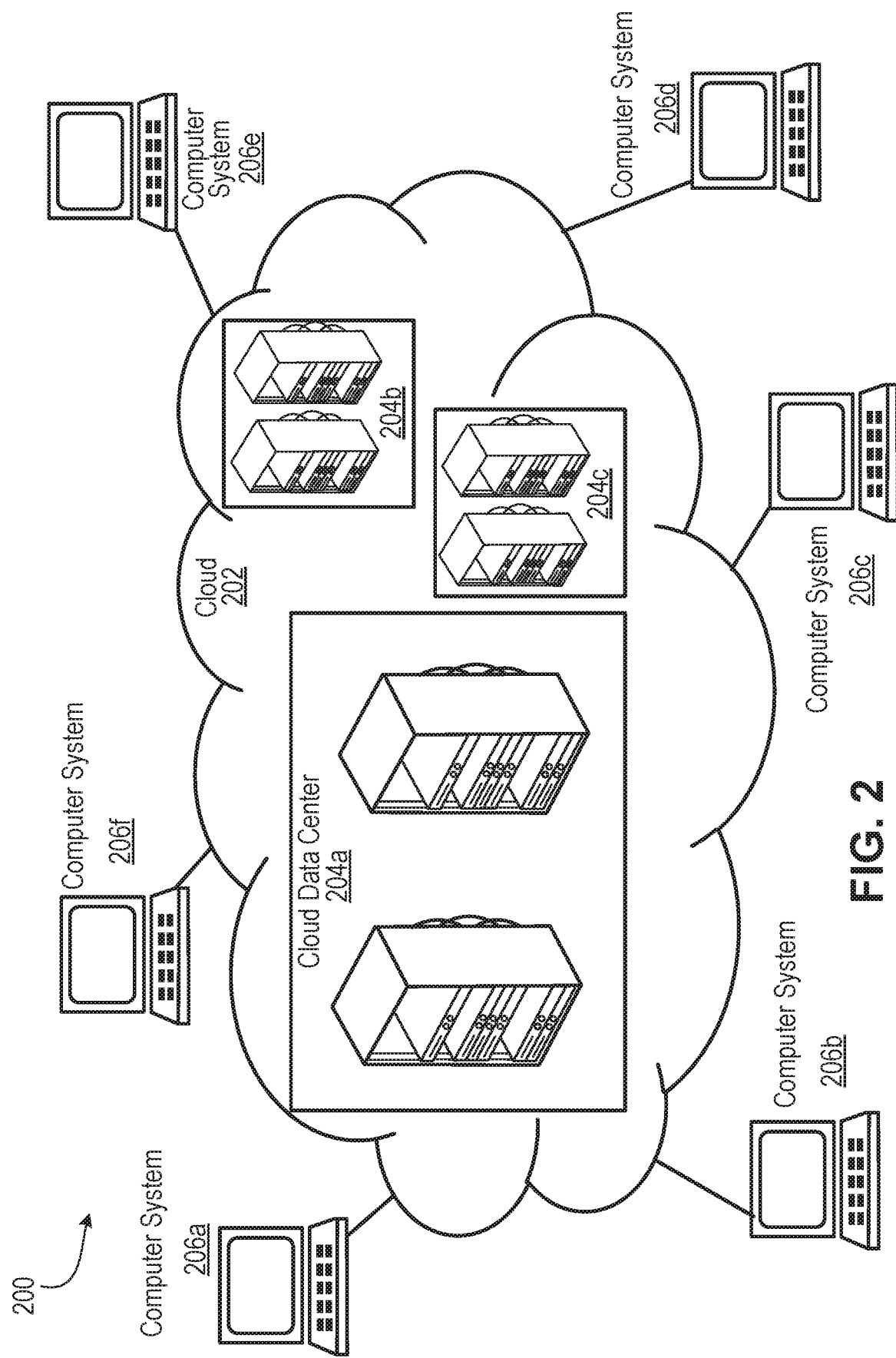
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.), and consumer electronics. In an embodiment, the computing systems 206a-f are implemented in or as a part of other systems.

Figure 3:
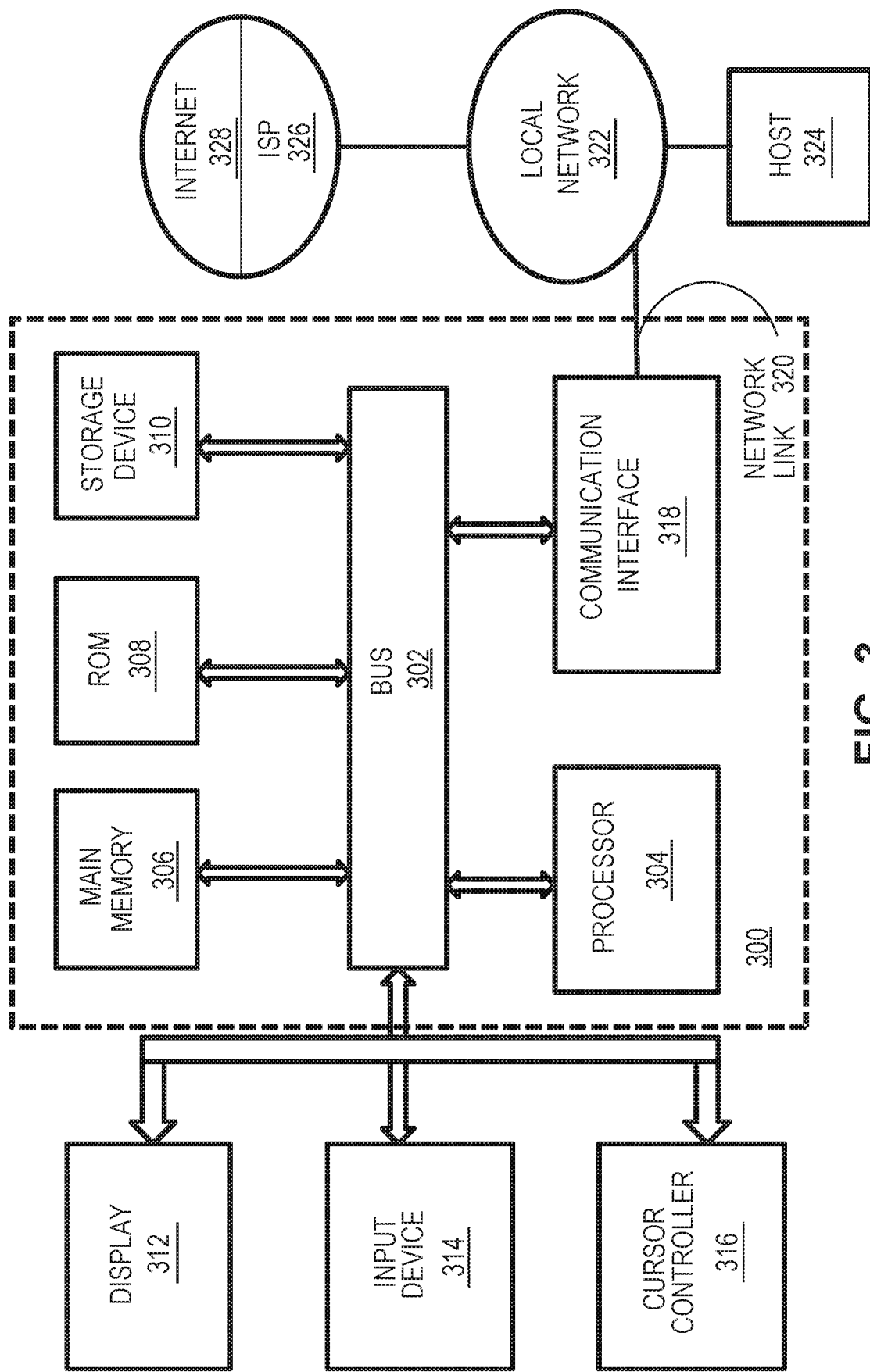
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices, or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
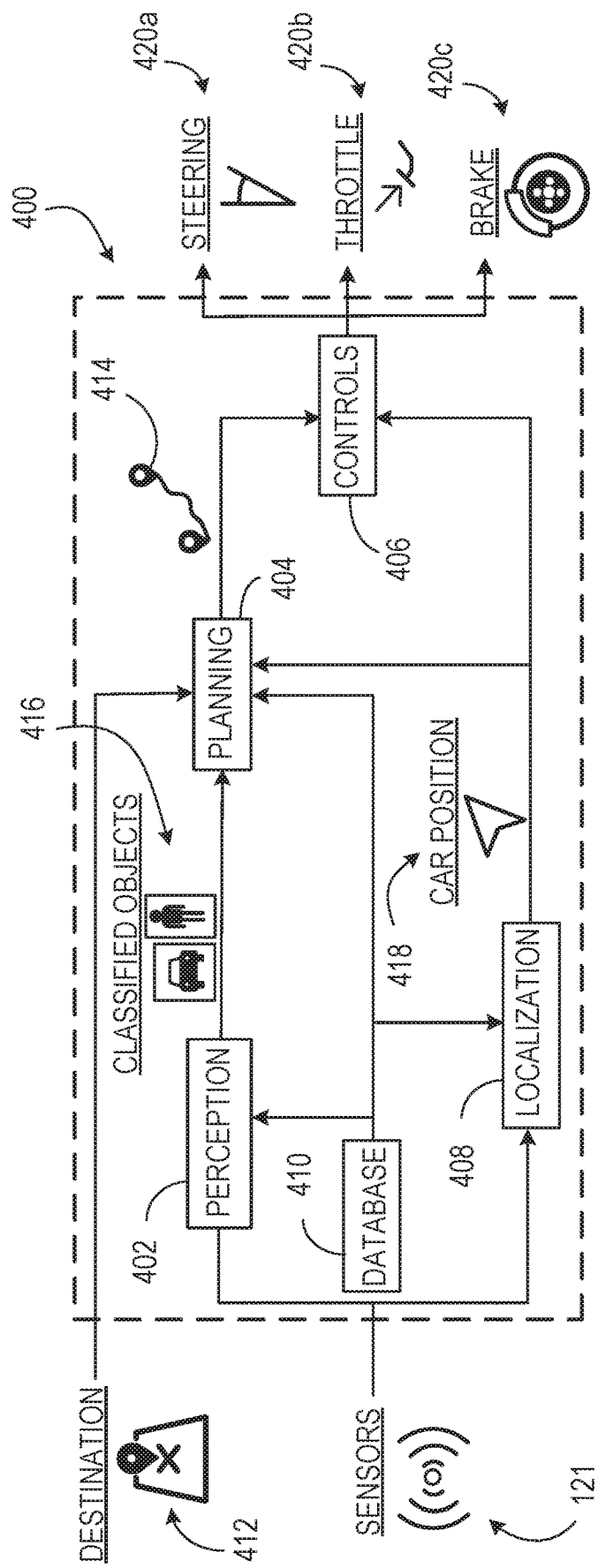
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs, or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
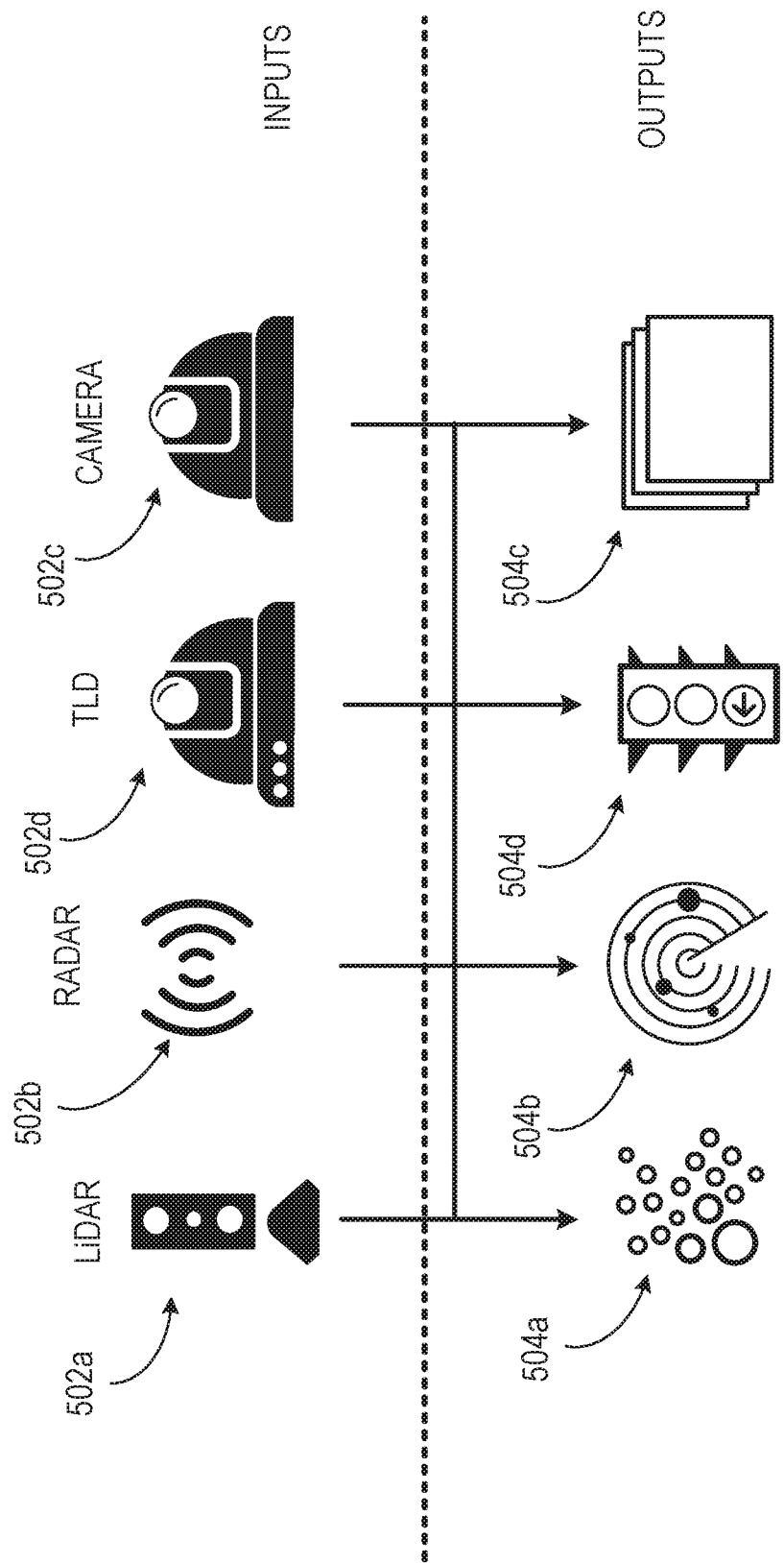
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum, for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
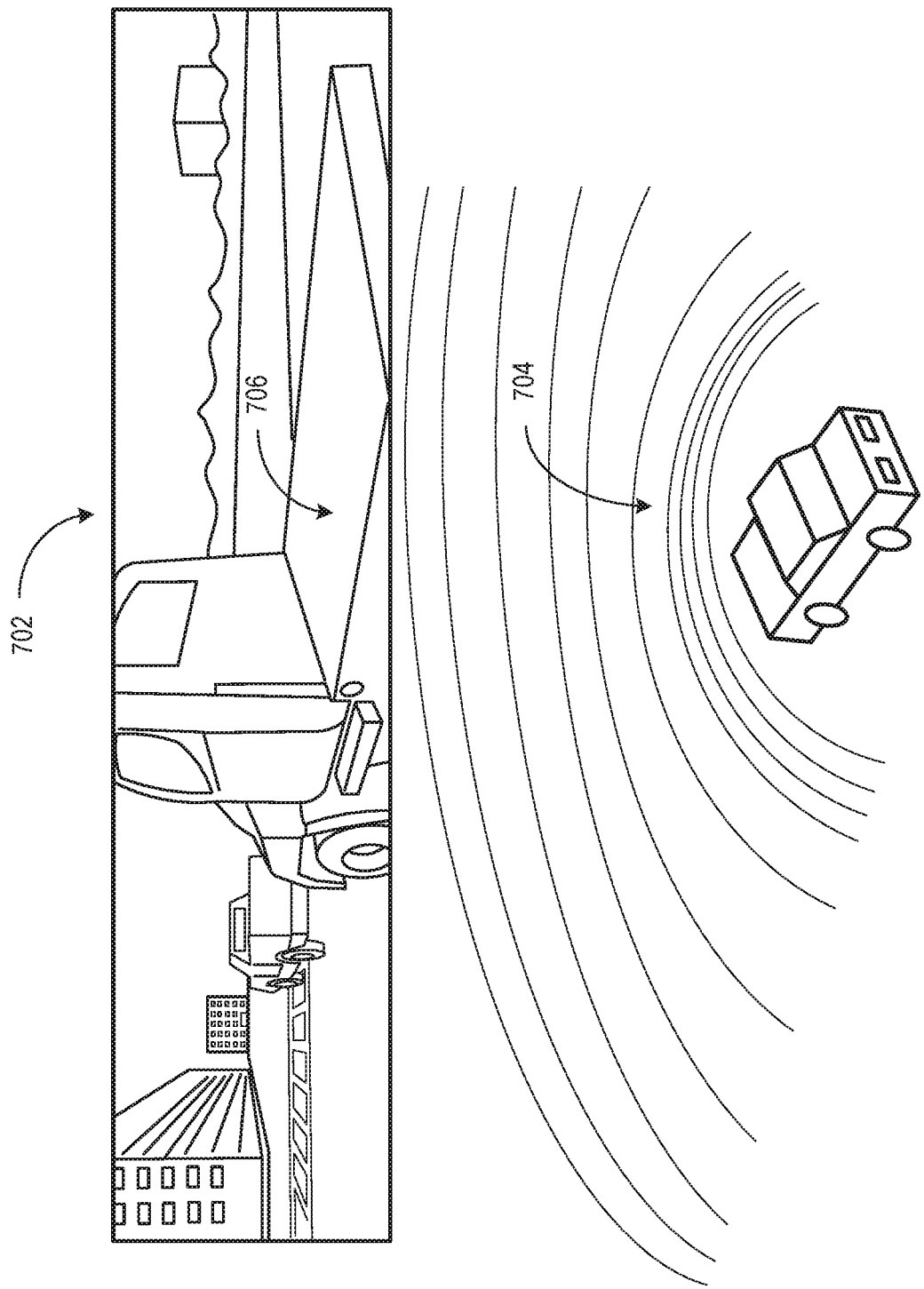
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
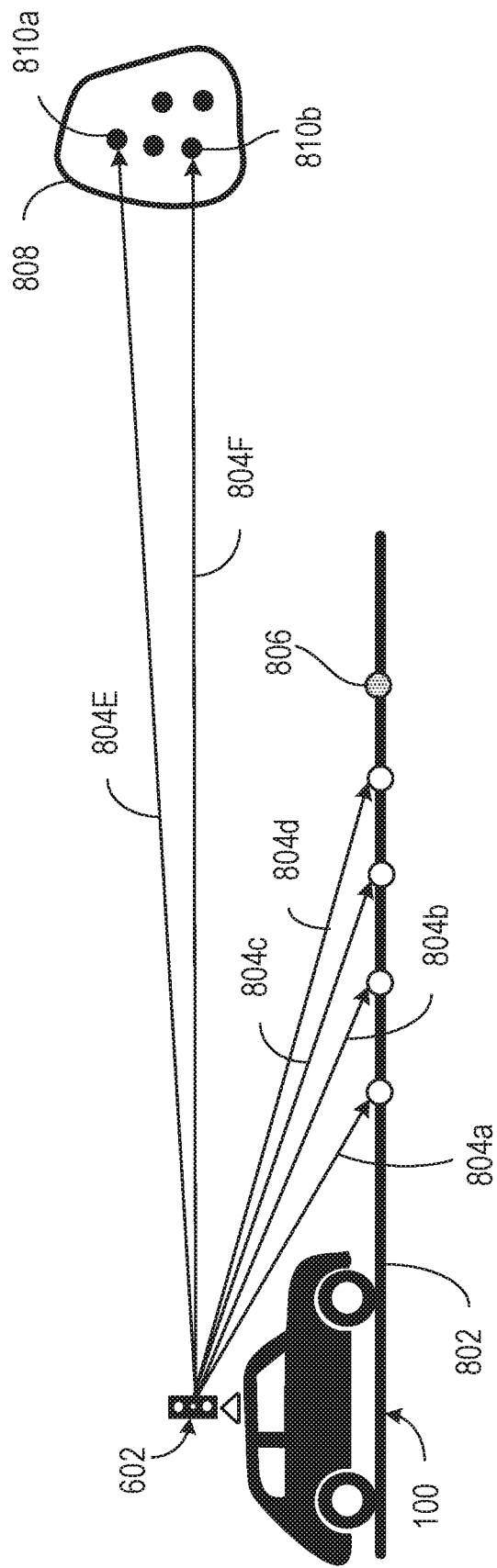
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
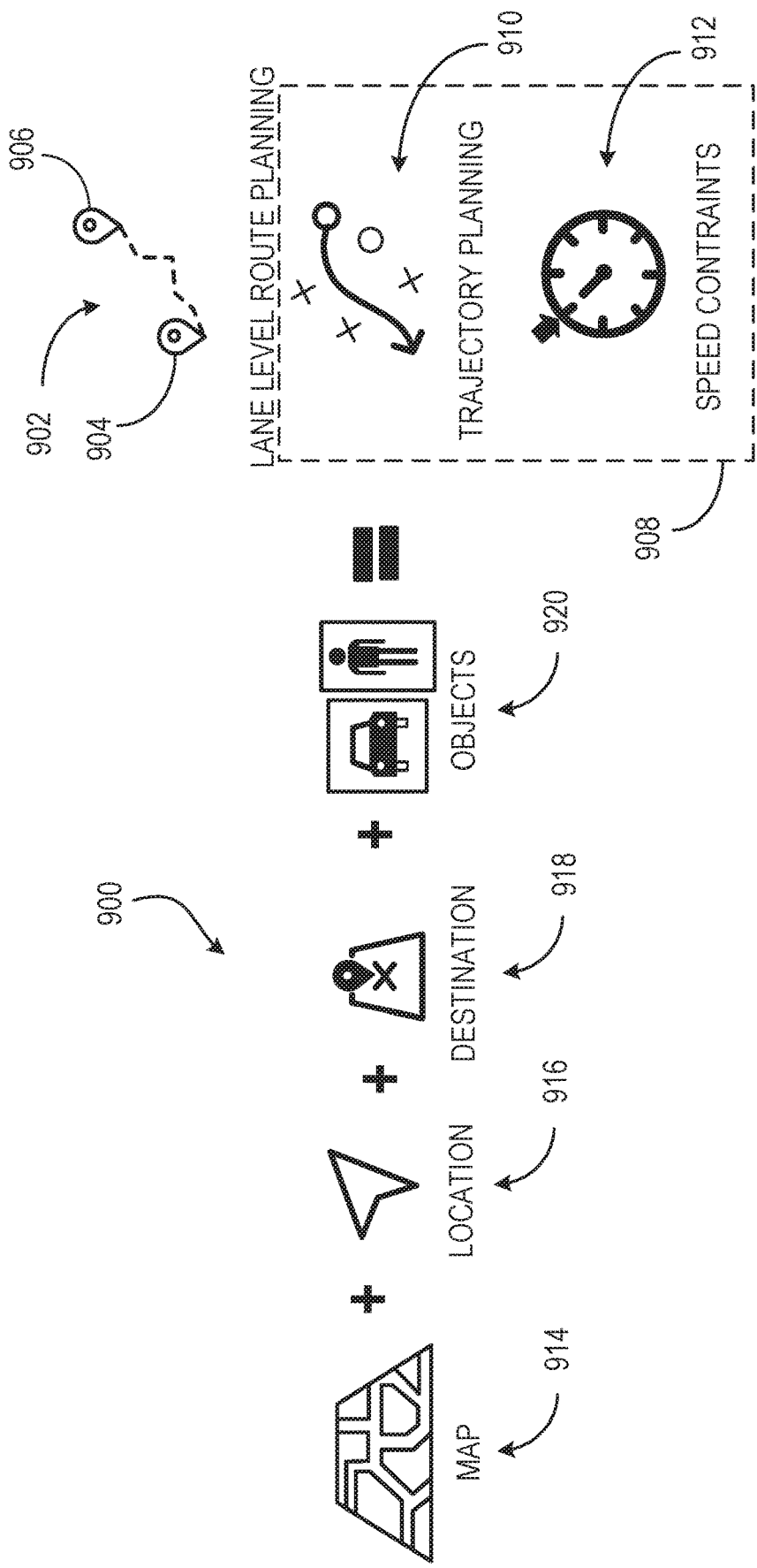
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
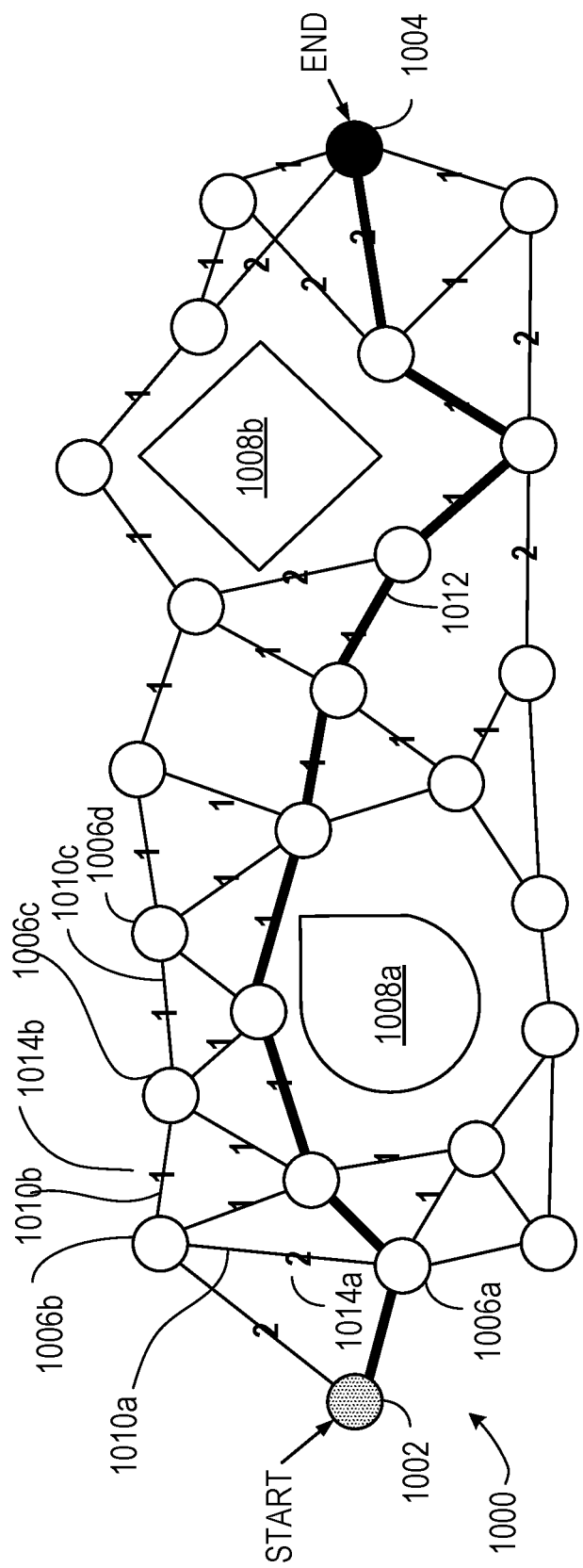
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start points 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008*a*-*b* represent regions that cannot be traversed by automobile, e.g., areas that have no streets or roads. When granularity is high, the objects 1008*a*-*b* represent physical objects in the field of view of the AV 100, e.g., other automobiles, pedestrians, or other entities with which the AV 100 cannot share physical space. In an embodiment, some or all of the objects 1008*a*-*b* are a static objects (e.g., an object that does not change position such as a street lamp or utility pole) or dynamic objects (e.g., an object that is capable of changing position such as a pedestrian or other car).

The nodes 1006*a*-*d* are connected by edges 1010*a*-*c*. If two nodes 1006*a*-*b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a*-*c* are often bidirectional, in the sense that an AV 100 travels from a first node to a second node, or from the second node to the first node. In an embodiment, edges 1010*a*-*c* are unidirectional, in the sense that an AV 100 can travel from a first node to a second node, however the AV 100 cannot travel from the second node to the first node. Edges 1010*a*-*c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a*-*c* has an associated cost 1014*a*-*b*. The cost 1014*a*-*b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a*-*b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
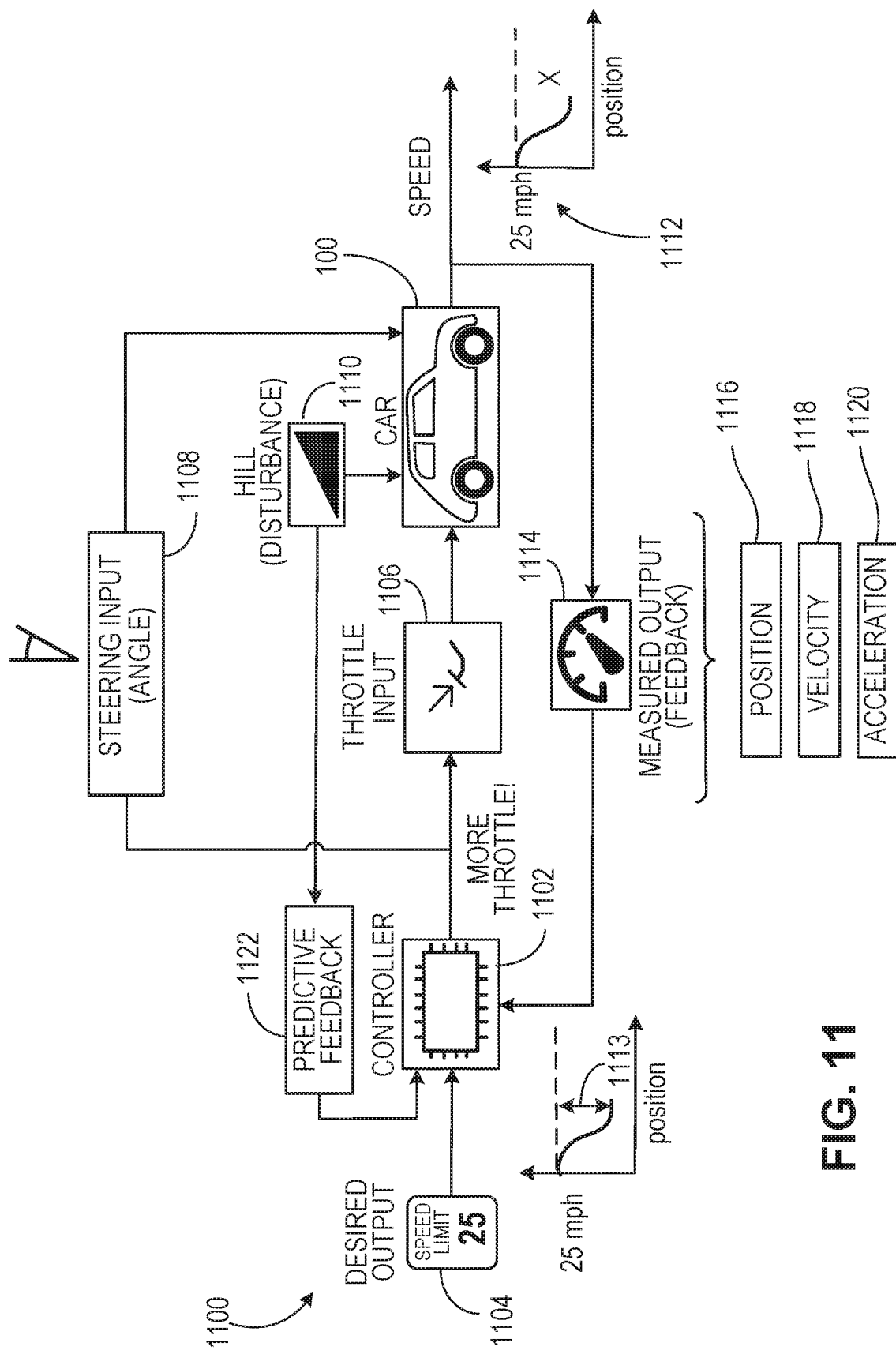
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, data about the disturbance 1110 is detected in advance, e.g., by a sensor such as a camera or LiDAR sensor, and provided to a predictive feedback module 1122. The predictive feedback module 1122 then provides data to the controller 1102 that the controller 1102 can use to adjust accordingly. For example, if the sensors of the AV 100 detect ("see") a hill, this data can be used by the controller 1102 to prepare to engage the throttle at the appropriate time to avoid significant deceleration.

Block Diagram of the Inputs, Outputs, and Components of the Controller

Figure 12:
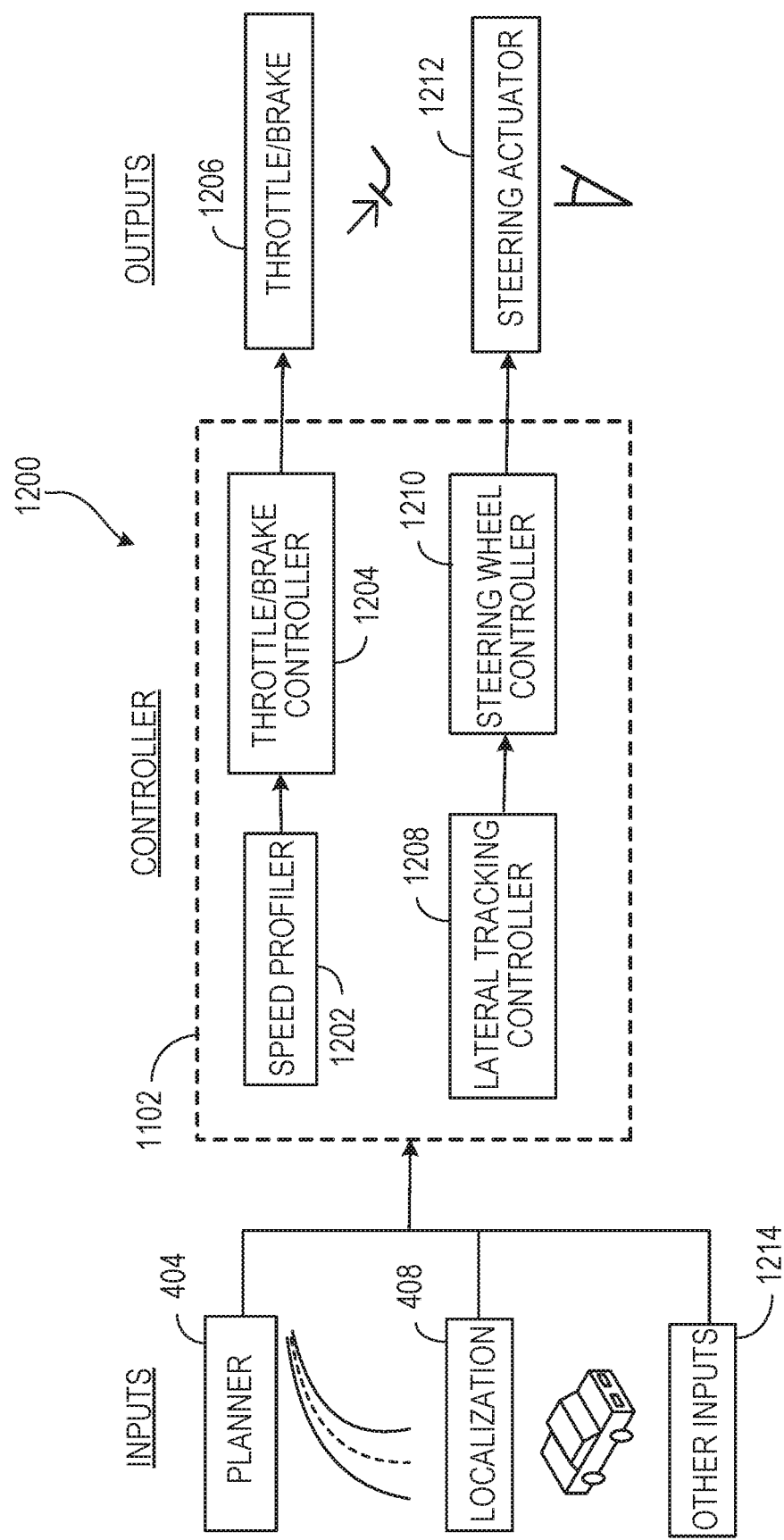
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides data used by the controller 1102, for example, to choose a heading when the AV 100 begins operation and to determine which road segment to traverse when the AV 100 reaches an intersection. A localization module 408 provides data to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives data from other inputs 1214, e.g., data received from databases, computer networks, etc.

Systems and Methods for Improving Vehicle Operations Using Movable Sensors

Figure 13:
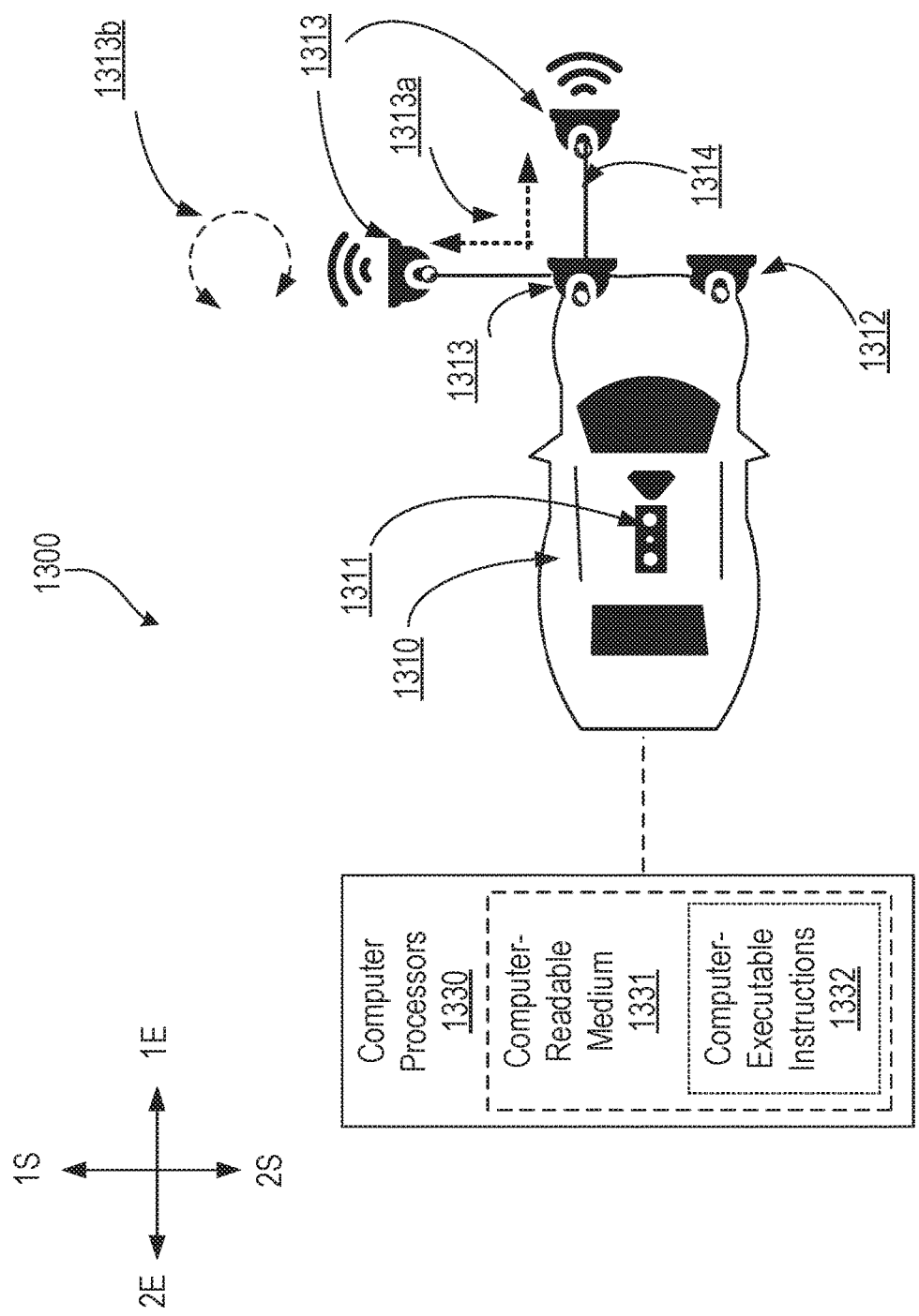
FIG. 13 is an illustration showing a system 1300 for improving the vehicle operations of vehicles having stationary sensors by using movable sensors, in accordance with one or more embodiments of the present disclosure.

FIG. 13 is an illustration showing a system 1300 for improving the vehicle operations of vehicles having stationary sensors by using movable sensors, in accordance with one or more embodiments of the present disclosure. The system 1300 includes an AV 1310. The AV 1310 includes a first sensor 1311, a second sensor 1312, a third sensor 1313, and computer processors 1330. The computer processors 1330 include a computer-readable medium 1331. The computer-readable medium 1331 includes computer-executable instructions 1332 stored thereon.

For descriptive purposes, objects will be described as they are located relative to ends and sides of the AV 1310. As shown in FIG. 13, the AV 1310 has a first end (1E), a second end (2E), a first side (1S) and a second side (2S).

Each of the sensors 1311, 1312, 1313 can be one of several types of sensing devices. In an embodiment, each of the sensors 1311, 1312, 1313 is one of the sensors 121 discussed previously with reference to FIG. 1. In an embodiment, each of the sensors 1311, 1312, 1313 is one or more of the inputs 502a-c as discussed previously with reference to FIG. 5. In an embodiment, the first sensor 1311 is a LiDAR, the second sensor 1312 is a camera, and the third sensor 1313 is a camera. The cameras can be monocular or stereo video cameras configured to capture light in the visible, infrared, and/or thermal spectra. In an embodiment, at least one of the sensors 1311, 1312, 1313 is an ultrasonic sensor. In an embodiment, at least one of the sensors 1311, 1312, 1313 is a RADAR. At least one of the sensors 1311, 1312, 1313 can also include a combination of sensing devices. In an embodiment, at least one of the sensors 1311, 1312, 1313 includes a camera and a RADAR. In an embodiment, at least one of the sensors 1311, 1312, 1313 also includes additional sensors for sensing or measuring properties of the AV's 1310 environment. In an embodiment, at least one of the sensors 1311, 1312, 1313 include additional sensors such as monocular or stereo video cameras 122 capable of perceiving the visible light, infrared, and/or thermal spectra, LiDAR 123, RADAR, ultrasonic sensors, time-of-flight (TOF) depth sensors, speed sensors, temperature sensors, humidity sensors, and precipitation sensors.

Although the illustrated embodiment includes a first sensor 1311, a second sensor 1312, and a third sensor 1313, the AV 1310 can include one or more additional sensors. In an embodiment, the AV 1310 includes a fourth sensor. In an embodiment, the AV 1310 includes a fourth, fifth and/or sixth sensor. The AV 1310 can also include less sensors. In an embodiment, the AV 1310 only includes the first sensor 1311 and the second sensor 1312.

Although the illustrated embodiment includes a first sensor 1311, a second sensor 1312, and a third sensor 1313, the AV 1310 can include one or more additional sensors. In an embodiment, the AV 1310 includes a fourth sensor. In an embodiment, the AV 1310 includes a fourth, fifth and/or sixth sensor. The AV 1310 can also include less sensors. In an embodiment, the AV 1310 only includes the first sensor 1311 and the second sensor 1312.

One or more of the sensors 1311, 1312, 1313 are configured to move in at least one direction. In an embodiment, one or more sensors are configured to extend in one or more directions and/or rotate about at least one axis of rotation in one or more directions. In an embodiment, the third sensor 1313 is configured to extend in multiple directions 1313a and rotate in multiple directions about an axis of rotation 1313b. For example, the third sensor 1313 can be extended laterally, diagonally, and perpendicularly (above and below the vehicle). The axis of rotation 1313b can be fixed or it can be configured to vary. In an embodiment, the AV 1310 includes at least two movable sensors. In an embodiment, the first sensor 1311 and/or the second sensor 1312 are configured to move in at least one direction.

One or more of the sensors 1311, 1312, 1313 are mounted to the body of the AV 1310 using a movable support apparatus. In an embodiment, the movable third sensor 1313 is mounted to the body of the AV 1310 by using the movable support apparatus 1314. The movable support apparatus 1314 can be any device capable of fixing a sensor to the body of the vehicle and configured to move the corresponding sensor relative to the vehicle (e.g., by extending and/or rotating relative to the vehicle). In an embodiment, the movable support apparatus 1314 is a gimbal. In an embodiment, the movable support apparatus 1314 is an extendable pole mount. The extendable pole mount can have a rotatable end capable of rotating the third sensor 1313, such that the field of view (FOV) of the third sensor 1313 rotates with respect to the AV 1310.

Figure 14:
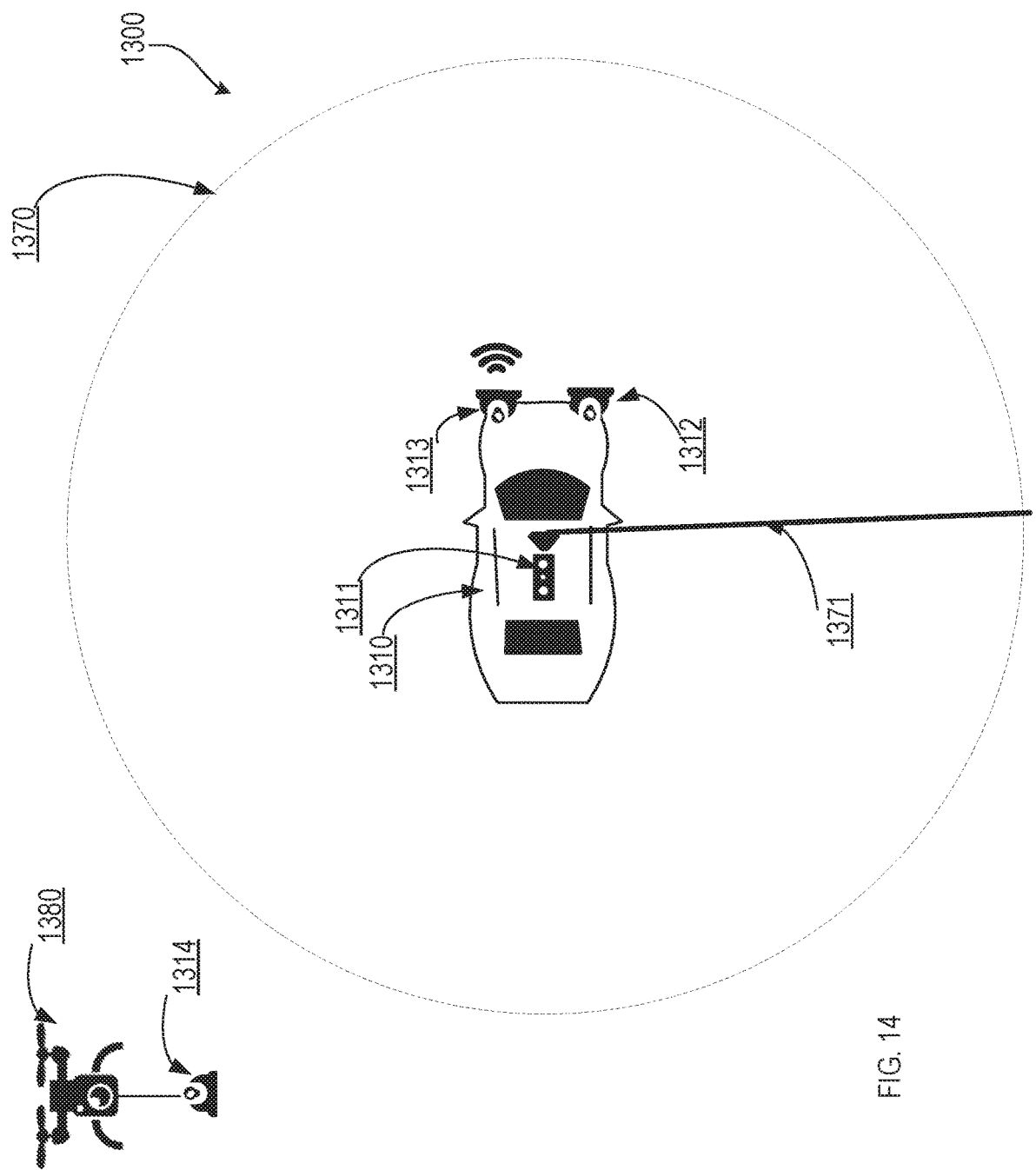
FIG. 14 is an illustration showing an aerial platform configured to have a movable sensor and be geographically tethered to a vehicle, according to one or more embodiments of the present disclosure.

The system 1300 can also include a movable sensor attached to an aerial platform (e.g., a unmanned aerial vehicle, drone, blimp, etc.) that is geographically tethered to the AV 1310. FIG. 14 is an illustration showing the system 1300 including an aerial platform 1380 configured to have a movable sensor 1314 and be geographically tethered to the AV 1310, according to one or more embodiments of the present disclosure. As shown, the aerial platform 1380 includes the movable sensor 1314, which is configured to extend and/or rotate in multiple directions. The aerial platform 1380 is configured to stay within a predefined area 1370 proximate to the AV 1310. The predefined area 1370 is defined by a radius 1371. The radius 1371 can be a user/manufacturer design choice and can be based on safety and/or practical considerations. In an embodiment, the radius 1371 is 0.5 km. In an embodiment, the radius 1371 is 1.0 km. In an embodiment, the aerial platform 1380 is configured to stay within a predefine height relative to the AV 1310. In an embodiment, the aerial platform 1380 is configured to stay more than 0.3 km above the AV 1310, from 0.5 km to 0.7 km above the AV 1310, 1.0 km above the AV 1310, and so forth.

Referring back to FIG. 13, the computer-readable medium 1331 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable medium 1331 stores code-segment having the computer-executable instructions 1332.

In an embodiment, the computer processors 1330 include one or more computer processors (e.g., microprocessors, microcontrollers, or both) similar to the processor 304 discussed earlier with reference to FIG. 3. The computer processors 1330 are configured to execute program code such as the computer-executable instructions 1332. The computer processors 1330 are configured to be communicatively coupled to the first, second and third sensors 1311, 1312, 1313. When the computer processors 1330 execute the computer-executable instructions 1332, the computer processors 1330 are caused to carry out several operations.

In an embodiment, when the computer processors 1330 are executing the computer-executable instructions 1332, the computer processors 1330 carry out operations to receive data associated with the environment in which the AV 1310 is operating. In an embodiment, the received environment data corresponds with road conditions, traffic conditions, and/or road features. In an embodiment, the received environment data includes data from a global positioning system (GPS) device or other satellite based navigation devices. The GPS can be included within the AV 1310 or it can be remote from the AV 1310. In an embodiment, the received environment data from the GPS device includes information about the road on which the AV 1310 is traversing (e.g., upcoming turns, inclines, intersections, etc.). In an embodiment, the received environment data includes sensor data from one or more sensors remote from the AV 1310. For example, in an embodiment, the received environment data includes data from a sensor mounted on a second AV. The received environment data can include data from a sensor mounted on a traffic light structure. In an embodiment, the received environment data includes sensor data captured by the sensors 1311, 1312, 1313 of the AV 1310.

In an embodiment, the received environment data includes data from the remotely located database 134, as discussed previously with reference to FIG. 1, and/or the cloud data centers 204a, 204b, 204c, as discussed previously with reference to FIG. 2. In an embodiment, the received environmental data includes road traffic data associated with the level of road traffic proximate to the AV 1310. For instance, road traffic data can include indicators such as a roadway level-of-service (LOS) value indicating the intensity of congestion on a road or intersection rated from "A" (least congested) to "F" (most congested). The road traffic data can include indicators such as a travel time index associated with the road segment on which the AV 1310 is traversing that indicates the ratio of peak to off-peak (e.g., rush hour to non-rush hour) travel speeds. The road traffic data can include object detection data of one or more sensors (e.g., mounted on the AV 1310 and/or remote from the AV 1310) indicating the number of vehicles travelling proximate to the AV 1310 and/or speed data indicating the speed that the AV 1310 is travelling.

While the computer processors 1330 are executing the computer-executable instructions 1332, the computer processors 1330 carry out operations to determine a context of the AV 1310 based on the received environment data. In an embodiment, determining a context of the AV 1310 includes determining that the AV 1310 is approaching one or more turns in the road, determining that the AV 1310 is approaching an intersection, determining that the AV 1310 is traversing a highway onramp, determining that the AV 1310 is operating in high-level traffic conditions, and/or determining that at least one of the sensors 1311, 1312, 1313 is experiencing an at least partially occluded FOV.

In an embodiment, if the computer processors 1330 receive road feature data from a GPS device and/or one or more sensors (either remote or corresponding with the AV 1310), the road feature data being associated with the road on which the AV 1310 is traversing, the computer processors 1330 determine, based on the received road feature data, whether the AV 1310 is approaching a sharp turn in the road and/or a T-intersection in the road. The computer processors 1330 can, based on the received road feature data, determine whether the AV 1310 is traversing (or will be traversing) a highway onramp. Herein, the term highway is given its broadest meaning and refers to interstates, autobahns, motorways, highways, expressways, freeways, and so forth. As another example, the received environment data can include object detection data from one or more of the AV's 1310 sensors 1311, 1312, 1313. Based on the received object detection data, the computer processors 1330 can determine whether any one of the sensors 1311, 1312, 1313 is experiencing an occluded (e.g., partially and/or fully) FOV. The computer processors 1330 can also determine that the AV 1310 is operating in a high level of traffic when the received data indicates that the AV 1310 is operating in traffic conditions having a traffic level exceeding a predetermined traffic threshold. In an embodiment, the computer processors 1330 determine that the AV 1310 is operating in high level traffic conditions when the traffic conditions proximate to the AV 1310 cause a roadway LOS grade of D and the predetermine threshold LOS grade is C. The predetermined traffic threshold can be a user or manufacturing choice, and can be based on safety and/or efficiency considerations.

While executing the computer-executable instructions 1332, the computer processors 1330 carry out operations to determine that, based on the context of the AV 1310, additional data is to be captured. Additional data can refer to information (e.g., proximate traffic, oncoming vehicles, proximate pedestrians, etc.) that is not currently being detected by the sensors 1311, 1312, 1313 but could be helpful to the AV 1310 for navigating its environment. In an embodiment, the computer processors 1330 determine that additional data is to be captured by determining a probability that additional data useful for vehicle navigation purposes is available outside a current FOV of one or more of the sensors 1311, 1312, 1313. In an embodiment, if the computer processors 1330 determine, based on the received data, that the AV 1310 is approaching a sharp turn and/or T-intersection in the road, the computer processors 1330 determine that additional data related to environmental locations that are distinct from a location of the turn/intersection. In an embodiment, the computer processors 1330 determine that there is a high probability (e.g., 75%, 80%, 90%, etc.) that object detection information located around the corners of the turn/intersection will be useful to detect whether other vehicles or objects are approaching from around the corners of the turn/intersection.

In an embodiment, if the computer processors 1330 determine, based on the received data, that the AV 1310 is traversing a highway onramp, the computer processors 1330 determine that additional data is to be captured for environmental locations opposite the AV's 1310 direction of traverse. In an embodiment, the computer processors 1330 determine that there is a high probability that object detection data located to the rear of the AV 1310 will be useful as the AV 1310 approaches a highway to increase detection of other vehicles approaching the AV 1310 rapidly from the rear. In an embodiment, if the computer processors 1330 determine, based on the received environment data, that one or more of the sensors 1311, 1312, 1313 are experiencing an occluded (e.g., partially or fully) FOV, the computer processors 1330 determine that additional data is to be captured at locations beyond the partially occluded FOV. For example, if one or more of the sensors' 1311, 1312, 1313 FOV is occluded by a large truck, the computer processors 1330 determine that there is a high probability that additional object detection data captured at locations beyond the large truck will be useful to increase awareness of the environment surrounding the AV 1310. Similarly, if the AV 1310 is approaching an intersection, and a large object (such as a large trash bin) has been placed on a corner of the intersection that occludes and limits one or more of the sensors' 1311, 1312, 1313 ability to detect oncoming traffic approaching from the left and/or right of the AV 1310, the computer processors 1330 determine that there is a high probability that additional object detection data captured at locations beyond the large object will be useful in increasing detection of approaching traffic and/or pedestrians at the intersection.

In an embodiment, if the computer processors 1330 determine, based on the received environment data, that the AV 1310 is operating in high level road traffic conditions (e.g., proximate traffic level is at a traffic level exceeding a predetermined traffic threshold), the computer processors 1330 determine that additional data is to be captured at locations of one or more blind spots of the AV 1310. Blind spots refers to locations on the AV 1310 that are vulnerable to being damaged by other vehicles (e.g., by being sideswiped, rear-ended, etc.) when the AV 1310 is operating in traffic and/or are not covered with overlapping FOVs by the sensors 1311, 1312, 1313. In an embodiment, if the computer processors 1330 determine that the AV 1310 is operating in traffic conditions causing a roadway LOS grade of D, and the predetermine threshold LOS grade is C, the computer processors 1330 determine that there is a high probability that object detection data at locations of one or more blind spots of the AV 1310 can be useful to increase FOV coverage and detection of potential vehicles that may cause damage to the AV 1310.

While executing the computer-executable instructions 1332, the computer processors 1330 carry out operations to determine if the third sensor 1313 is capable of capturing the additional data based on the current mechanical configuration of the third sensor 1313. As used herein, a mechanical configuration refers to a position on or relative to the AV 1310 that a sensor is situated, and a direction (e.g., azimuth angle and/or elevation angle) relative to the AV 1310 towards which a sensor's FOV is oriented. In an embodiment, the third sensor 1313 has a mechanical configuration in which the third sensor 1313 is situated on the corner of the first end (1E) and first side (1S) of the AV 1310, and in which its FOV is oriented at an offset of 25 degrees towards the first side (1S) of the AV 1310 relative to the AV's 1310 first end (1E). Based on the current mechanical configuration of the third sensor 1313 and the environmental locations for the additional data that are to be captured, the computer processors 1330 determine if the third sensor 1313 is capable of capturing the additional data. For example, if the third sensor 1313 is situated on the corner of the AV's 1310 first end (1E) and first side (1S), with a FOV oriented towards the AV's 1310 first end (1E), and the additional data determined to be captured is located towards the second end (2E) of the AV 1310, the computer processors 1330 determine that the third sensor 1313 is unable to capture the additional data. However, if the additional data is located within the FOV of the third sensor 1313 in its current mechanical configuration, the computer processors 1330 can determine that the third sensor 1313 is capable of capturing the additional data.

While executing the computer-executable instructions 1332, the computer processors 1330 carry out operations to cause the third sensor 1313 to move in a direction, such that the third sensor 1313 is able to capture the additional data, if the computer processors 1330 determine that the third sensor 1313 is not capable of capturing the additional data in its current mechanical configuration. In an embodiment, causing the third sensor 1313 to move includes extending the third sensor 1313 in at least one direction, rotating the third sensor 1313 in a direction about at least one axis of rotation (e.g., changing the azimuth or tilt angle of the third sensor 1313), or both.

Figure 15:
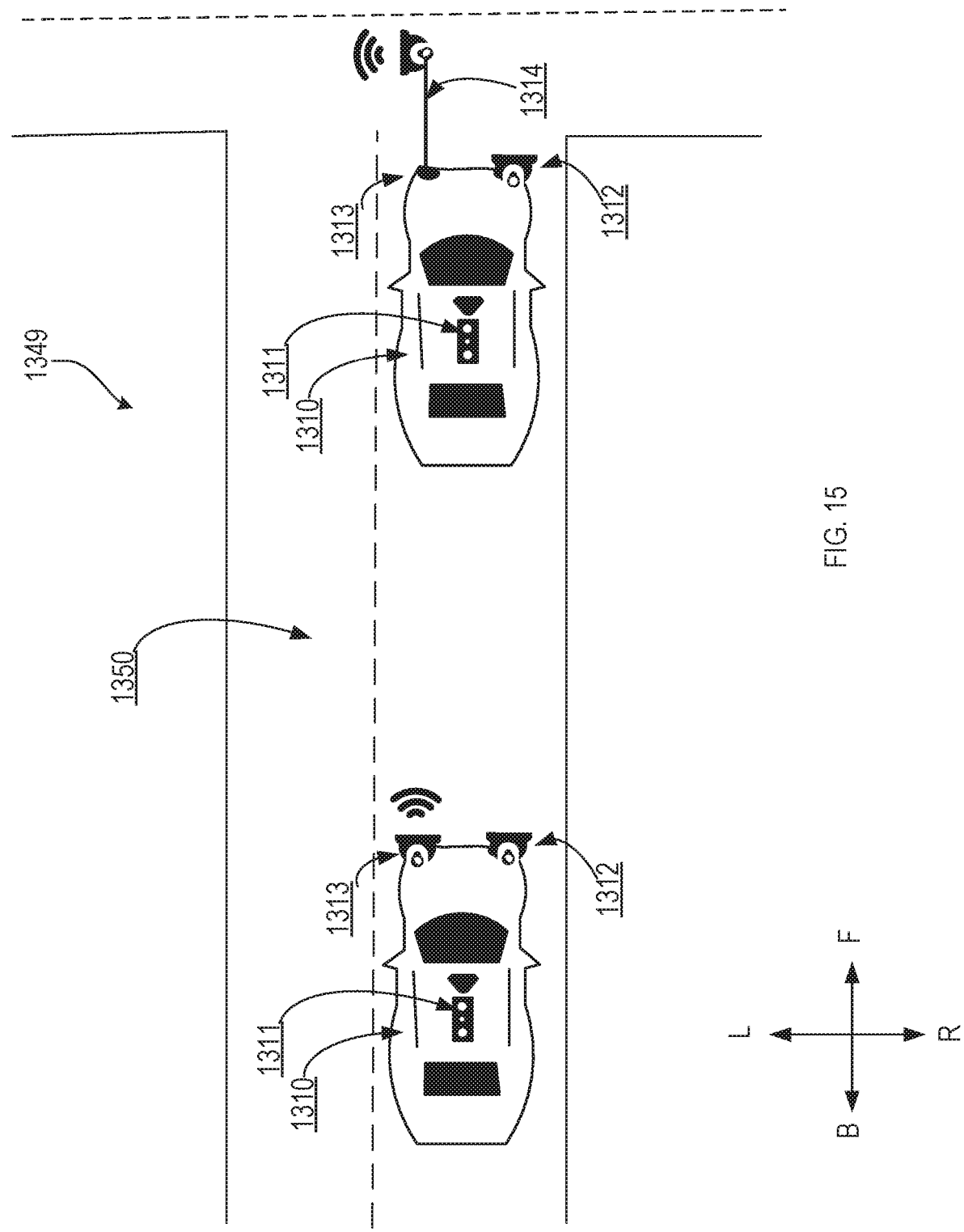
FIG. 15 is an illustration of a movable sensor being operated based on a determined context of a vehicle, in accordance with one or more embodiments of the present disclosure.

FIG. 15 is an illustrative example of an environment 1349 showing the third sensor 1313 being moved to capture additional data, according to one or more embodiments of the present disclosure. For illustrative purposes, objects in the AV's 1310 environment will be described as they relate to the AV's 1310 direction of travel, which in this case is the (F) direction. The direction opposite of the AV's 1310 direction of travel is the (B) direction, the direction to the left of the AV's 1310 direction of travel is the (L) direction, and the direction opposite of the AV's 1310 direction of travel is the (R) direction. The computer processors 1330 receive environment data (e.g., from a GPS device) indicating that the AV 1310 is approaching a T-intersection in the road 1350 on which the AV 1310 is traversing. Based on this, the computer processors 1330 determine that additional data is to be captured at points around the left (L) corner of the T-intersection. As shown, before the AV 1310 is at the T-intersection, the third sensor 1313 is incapable of capturing the additional data around the left (L) corner of the T-intersection because the third sensor 1313 is situated in close proximity to the corner of the AV's 1310 first end (1E) and first side (1S), and has a FOV oriented towards the (F) direction (e.g., parallel with the AV's 1310 direction of travel). As the AV 1310 approaches the T-intersection, the computer processors 1330 cause the third sensor 1313 to extend and rotate by, for example, actuating the extendable support apparatus 1314. The extending and rotating of the third sensor 1313 allows the third sensor 1313 to capture the additional data around the left corner of the T-intersection. The third sensor 1313 can also be rotated to capture additional data around the right corner of the T-intersection. Therefore, the third sensor 1313 can detect vehicle and/or pedestrian traffic approaching from multiple sides of the T-intersection, which can increase the AV's 1310 ability to safely navigate the T-intersection.

In an embodiment, if the computer processors 1330 determine that additional data is to be captured behind the AV 1310 as the AV 1310 is traversing a highway onramp, the computer processors 1330 cause the third sensor 1313 to extend and rotate by, for example, actuating the extendable support apparatus 1314 such that the third sensor 1313 is capable of capturing the additional data behind the AV 1310 (e.g., opposite the AV's 1310 direction of travel). In an embodiment, as the AV 1310 traverses the onramp, the computer processors 1330 rotate the third sensor's 1313 FOV to be oriented towards the direction opposite of the AV's 1310 direction of travel, while also extending the third sensor 1313 upwards and/or to the first side (1S) of the AV 1310. This can allow the third sensor 1313 to detect other vehicles and/or objects that may be approaching the AV 1310 rapidly from the second end (2E)/or provide additional object detection coverage to supplement other sensors that may have a FOV oriented to the second end (2E) of the AV 1310.

In an embodiment, if the computer processors 1330 determine that at least one of the sensors 1311, 1312, 1313 is experiencing a partially or fully occluded FOV (e.g., due to a large truck and/or object), the computer processors 1330 cause the third sensor 1313 to move such that the third sensor 1313 is capable of capturing sensor data beyond the occluded view. For instance, if a large truck is driving in the F direction of the AV 1310 and blocking the FOV of the second sensor 1312, the computer processors 1330 can cause the third sensor 1313 to extend and/or rotate such that the third sensor 1313 is capable of capturing sensor data at locations beyond the large truck. In an embodiment, if the computer processors 1330 determine that the AV 1310 is operating in high traffic conditions (e.g., roadway LOS with a grade of D and/or below), the computer processors 1330 cause the third sensor 1313 to extend and/or rotate such that the third sensor 1313 is capable of capturing sensor data at locations of potential blind spots associated with the AV 1310. In an embodiment, the computer processors 1330 rotate and extend the third sensor 1313 such that the third sensor's 1313 FOV is oriented substantially along the first side (1S) of the AV 1310 towards the second end (2E) of the AV 1310. Thus, the third sensor 1313 can detect other vehicles proximate to the AV 1310 in locations that may be subject to an increased probability of being damaged (e.g., from being sideswiped, rear-ended, etc.) during high traffic conditions due to, for example, other vehicles being in close proximity to the AV 1310.

In an embodiment, while executing the computer-executable instructions 1332, the computer processors 1330 carry out operations to determine if at least one of the sensors 1311, 1312, 1313 is capable of capturing additional data based on their current electronic configuration, and adjust at least one electronic function of at least one of the sensors 1311, 1312, 1313 such that at least one of the sensors 1311, 1312, 1313 is capable of capturing additional data. An electronic function refers to an electronic parameter of the sensor that facilitates the sensor's ability to capture data. In an embodiment, adjusting at least one electronic functions includes increasing/decreasing the sensor's scan rate, increasing/decreasing the sensor's digital zoom, increasing/decreasing the sensor's beam power, increasing/decreasing the sensor's pixel resolution, and/or increasing/decreasing the sensor's beam width. In an embodiment, when the AV 1310 is operating in high traffic conditions, the computer processors 1330 determine that an increase in object detection accuracy is desirable and can increase the scan rate and/or pixel resolution of one or more of the sensors 1311, 1312, 1313.

In an embodiment, while executing the computer-executable instructions 1332, the computer processors 1330 carry out operations to receive operational data associated with at least one of the sensors 1311, 1312, 1313, and cause, based on the received operational data, the third sensor 1313 to move in a direction. In an embodiment, if the operational data indicates that the first sensor 1311 and/or the second sensor 1312 is experiencing a failure condition (e.g., the first and/or second sensor 1311, 1312 has become inoperable, damaged, de-calibrated, etc.), the computer processors 1330 cause the third sensor 1313 to extend and/or rotate such that the third sensor's 1313 FOV is oriented to provide at least partial coverage of the FOV associated with the sensor experiencing a failure condition. In an embodiment, if the second sensor 1312 becomes damaged and/or inoperable, the computer processors 1330 can cause the third sensor 1313 to extend/ and/or rotate such that the third sensor's 1313 FOV can supplement the second sensor's FOV.

In an embodiment, while executing the computer-executable instructions 1332, the computer processors 1330 carry out operations to transmit sensor data captured by the third sensor 1313 (or other movable sensors) to one or more remote vehicle systems. In an embodiment, the computer processors 1330 transmit data captured by the third sensor 1313 to the remotely located database 134 as described earlier with reference to FIG. 1. Other AV systems can access the stored data from the remotely located database 134. In an embodiment, the computer processors 1330 are communicatively coupled directly with other AV systems for transmitting the data captured by the third sensor 1313.

Figure 16:
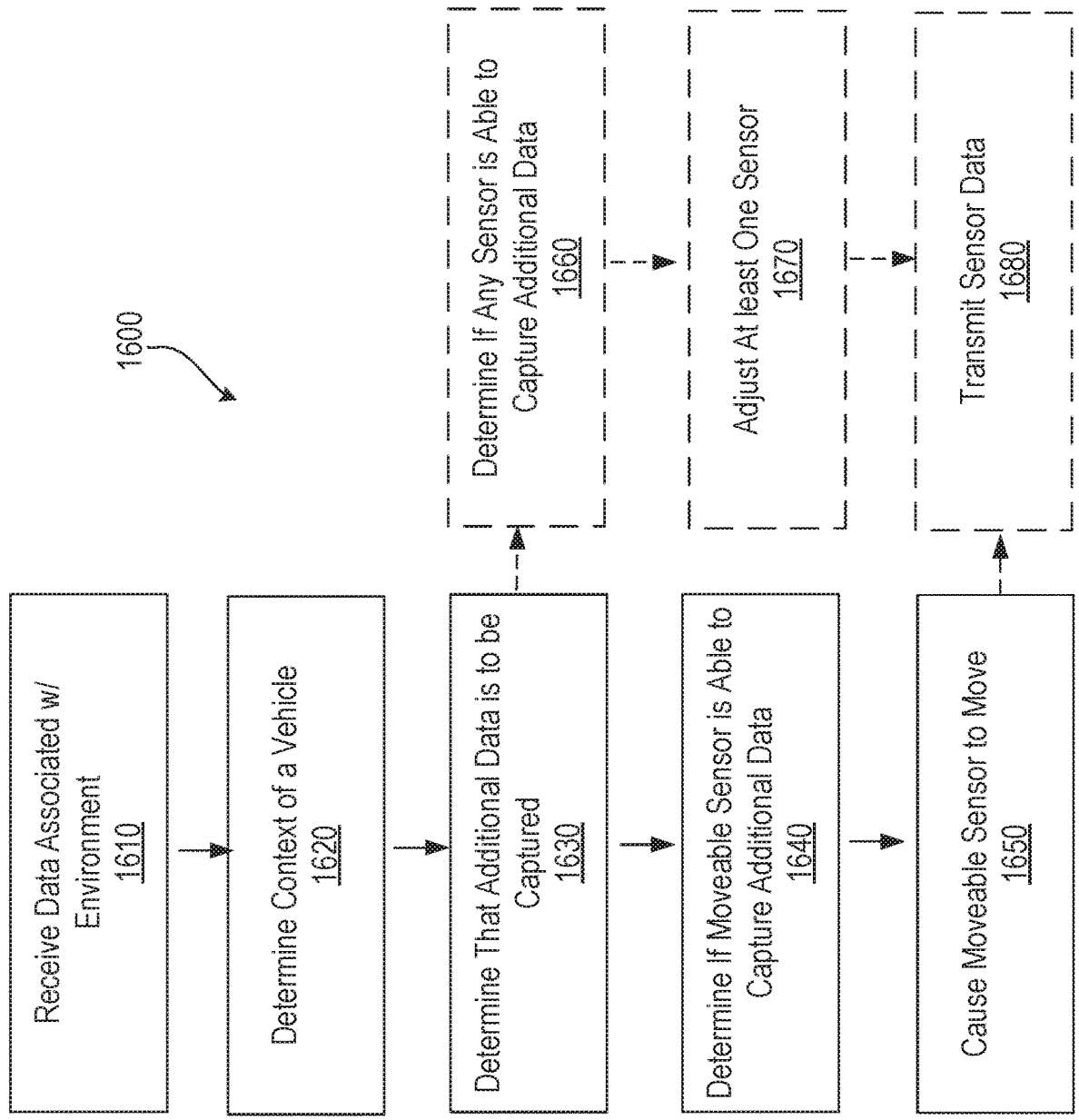
FIG. 16 is a flowchart depicting a method for improving the vehicle operations of vehicles having stationary sensors by using movable sensors, in accordance with one or more embodiments of the present disclosure.

FIG. 16 is a flowchart depicting a method 1600 for improving the vehicle operations of vehicles having stationary sensors by using movable sensors, in accordance with one or more embodiments of the present disclosure. For illustrative purposes, the method 1600 will be described as performed by the system 1300 for improving vehicle operations using movable sensors, as previously discussed with reference to FIG. 13. However, the method 1600 can be performed by other systems for improving vehicle operations. The method 1600 includes receiving data associated with an environment (block 1610), determining a context of a vehicle (block 1620), determining that additional data is to be captured (block 1630), determining if a movable sensor is able to capture the additional data (block 1640), and causing the movable sensor to move (block 1650). In an embodiment, the method 1600 includes determining if any sensor is able to capture additional data (block 1660) and adjusting at least one sensor (block 1670). In an embodiment, the method 1600 includes transmitting sensor data (block 1680).

At block 1610, the computer processors 1330 carry out operations to receive data associated with the environment in which the AV 1310 is operating. In an embodiment, the received environment data corresponds with road conditions, traffic conditions, and/or road features. In an embodiment, the received environment data includes data from a global positioning system (GPS) device or other satellite based navigation devices. The GPS can be included within the AV 1310 or it can be remote from the AV 1310. In an embodiment, the received environment data from the GPS device includes information about the road on which the AV 1310 is traversing (e.g., upcoming turns, inclines, intersections, etc.). In an embodiment, the received environment data includes sensor data from one or more sensors remote from the AV 1310. In an embodiment, the received environment data includes data from a sensor mounted on a second AV. The received environment data can include data from a sensor mounted on a traffic light structure. In an embodiment, the received environment data includes sensor data captured by the sensors 1311, 1312, 1313 of the AV 1310.

In an embodiment, the received environment data includes data from the remotely located database 134, as discussed previously with reference to FIG. 1, and/or the cloud data centers 204a, 204b, 204c, as discussed previously with reference to FIG. 2. In an embodiment, the received environmental data includes road traffic data associated with the level of road traffic proximate to the AV 1310. For instance, road traffic data can include indicators such as a roadway level-of-service (LOS) value indicating the intensity of congestion on a road or intersection rated from "A" (least congested) to "F" (most congested). The road traffic data can include indicators such as a travel time index associated with the road segment on which the AV 1310 is traversing that indicates the ratio of peak to off-peak (e.g., rush hour to non-rush hour) travel speeds. The road traffic data can include object detection data of one or more sensors (e.g., mounted on the AV 1310 and/or remote from the AV 1310) indicating the number of vehicles travelling proximate to the AV 1310 and/or speed data indicating the speed that the AV 1310 is travelling.

At block 1620 the computer processors 1330 carry out operations to determine a context of the AV 1310 based on the received environment data. In an embodiment, determining a context of the AV 1310 includes determining that the AV 1310 is approaching one or more turns in the road, determining that the AV 1310 is approaching an intersection, determining that the AV 1310 is traversing a highway onramp, determining that the AV 1310 is operating in high-level traffic conditions, and/or determining that at least one of the sensors 1311, 1312, 1313 is experiencing an at least partially occluded FOV.

In an embodiment, if the computer processors 1330 receive road feature data from a GPS device and/or one or more sensors (either remote or corresponding with the AV 1310), the road feature data being associated with the road on which the AV 1310 is traversing, the computer processors 1330 determine, based on the received road feature data, whether the AV 1310 is approaching a sharp turn in the road and/or a T-intersection in the road. The computer processors 1330 can also, based on the received road feature data, determine whether the AV 1310 is traversing (or will be traversing) a highway onramp. Herein, the term highway is given its broadest meaning and refers to interstates, autobahns, motorways, highways, expressways, freeways, and so forth. As another example, the received environment data can include object detection data from one or more of the AV's 1310 sensors 1311, 1312, 1313. Based on the received object detection data, the computer processors 1330 can determine whether any one of the sensors 1311, 1312, 1313 is experiencing an occluded (e.g., partially and/or fully) FOV. The computer processors 1330 can also determine that the AV 1310 is operating in a high level of traffic when the received data indicates that the AV 1310 is operating in traffic conditions having a traffic level exceeding a predetermined traffic threshold. In an embodiment, the computer processors 1330 determine that the AV 1310 is operating in high level traffic conditions when the traffic conditions proximate to the AV 1310 cause a roadway LOS grade of D and the predetermine threshold LOS grade is C. The predetermined traffic threshold can be a user or manufacturing choice, and can be based on safety and/or efficiency considerations.

At block 1630, the computer processors 1330 carry out operations to determine that, based on the context of the AV 1310, additional data is to be captured. In an embodiment, the computer processors 1330 determine that additional data is to be captured by determining a probability that additional data useful for vehicle navigation purposes is available outside a current FOV of one or more of the sensors 1311, 1312, 1313. For example, if the computer processors 1330 determine, based on the received data, that the AV 1310 is approaching a sharp turn and/or T-intersection in the road, the computer processors 1330 determine that additional data is to be captured at locations that are distinct from a location of the turn/intersection. The computer processors 1330 determine that there is a high probability (e.g., 75%, 80%, 90%, etc.) that object detection information located around the corners of the turn/intersection will be useful to detect whether other vehicles or objects are approaching from around the corners of the turn/intersection.

Similarly, if the computer processors 1330 determine, based on the received data, that the AV 1310 is traversing a highway onramp, the computer processors 1330 determine that additional data is to be captured at locations opposite the AV's 1310 direction of traverse. For example, the computer processors 1330 determine that there is a high probability that object detection data located to second end (2E) of the AV 1310 will be useful as the AV 1310 approaches a highway to increase detection of other vehicles approaching the AV 1310 rapidly from its second end (2E). In an embodiment, if the computer processors 1330 determine, based on the received environment data, that one or more of the sensors 1311, 1312, 1313 are experiencing an occluded (e.g., partially or fully) FOV, the computer processors 1330 determine that additional data is to be captured at locations beyond the partially occluded FOV. For example, if one or more of the sensors' 1311, 1312, 1313 FOV is occluded by a large truck, the computer processors 1330 determine that there is a high probability that additional object detection data captured at locations beyond the large truck will be useful to increase awareness of the environment surrounding the AV 1310. As another example, assume that the AV 1310 is approaching an intersection and a large object (such as a large trash bin) has been placed on a corner of the intersection that occludes and limits one or more of the sensors' 1311, 1312, 1313 ability to detect oncoming traffic approaching from the left and/or right of the AV 1310 with respect to the AV's 1310 direction of travel. The computer processors 1330 can determine that there is a high probability that additional object detection data captured at locations beyond the large object will be useful in increasing detection of approaching traffic and/or pedestrians at the intersection.

In an embodiment, if the computer processors 1330 determine, based on the received environment data, that the AV 1310 is operating in high level road traffic conditions (e.g., proximate traffic level is at a traffic level exceeding a predetermined traffic threshold), the computer processors 1330 determine that additional data is to be captured at locations of one or more blind spots of the AV 1310. Blind spots refer to locations on the AV 1310 that are vulnerable to being damaged by other vehicles (e.g., by being side-swiped, rear-ended, etc.) when the AV 1310 is operating in traffic and/or are not covered with overlapping FOVs by the sensors 1311, 1312, 1313. For example, if the computer processors 1330 determine that the AV 1310 is operating in traffic conditions causing a roadway LOS grade of D, and the predetermine threshold LOS grade is C, the computer processors 1330 determine that there is a high probability that object detection data at locations of one or more blind spots of the AV 1310 can be useful to increase FOV coverage and detection of potential vehicles that may cause damage to the AV 1310.

At block 1640, the computer processors 1330 carry out operations to determine if the third sensor 1313 is capable of capturing the additional data based on the current mechanical configuration of the third sensor 1313. As used herein, a mechanical configuration refers to a position on or relative to the AV 1310 that a sensor is situated, and a direction (e.g., azimuth angle and/or elevation angle) relative to the AV 1310 towards which a sensor's FOV is oriented. For example, the third sensor 1313 may have a mechanical configuration in which the third sensor 1313 is situated on the corner of the first end (1E) and first side (1S) of the AV 1310, and in which its FOV is oriented at an offset of 25 degrees to the left of the AV's 1310 direction of travel. Based on the current mechanical configuration of the third sensor 1313 and the environmental locations of sources of additional data determined to be captured, the computer processors 1330 determine if the third sensor 1313 is capable of capturing the additional data. In an embodiment, if the third sensor 1313 is situated on the corner of the first end (1E) and first side (1S) of the AVs 1310, with a FOV oriented parallel to the AV's 1310 direction of traverse, and the additional data determined to be captured is located to the rear of the AV 1310, the computer processors 1330 determine that the third sensor 1313 is unable to capture the additional data. However, if the additional data is located within the FOV of the third sensor 1313 in its current mechanical configuration, the computer processors 1330 can determine that the third sensor 1313 is capable of capturing the additional data.

At block 1650, the computer processors 1330 carry out operations to cause the third sensor 1313 to move in a direction, such that the third sensor 1313 is able to capture the additional data, if the computer processors 1330 determine that the third sensor 1313 is not capable of capturing the additional data in its current mechanical configuration. In an embodiment, causing the third sensor 1313 to move includes extending the third sensor 1313 in at least one direction, rotating the third sensor 1313 in a direction about at least one axis of rotation (e.g., changing the azimuth or tilt angle of the third sensor 1313), or both.

In an embodiment, if the computer processors 1330 receive environment data (e.g., from a GPS device) indicating that the AV 1310 is approaching a T-intersection in the road on which the AV 1310 is traversing, the computer processors 1330 determine that additional data is to be captured at points around the left (L) and/or right (R) corner of the T-intersection. In an embodiment, if the third sensor 1313 is incapable of capturing the additional data around the corners of the T-intersection, the computer processors 1330 cause the third sensor 1313 to extend and rotate by, for example, actuating the extendable support apparatus 1314 to allow the third sensor 1313 to capture the additional data at locations around the corners of the T-intersection. Therefore, the third sensor 1313 is capable of detecting vehicle and/or pedestrian traffic approaching from multiple sides of the T-intersection, increasing the AV's 1310 ability to safely navigate the T-intersection.

In an embodiment, if the computer processors 1330 determine that additional data is to be captured behind the AV 1310 as the AV 1310 is traversing a highway onramp, the computer processors 1330 cause the third sensor 1313 to extend and rotate by, for example, actuating the extendable support apparatus 1314 such that the third sensor 1313 is capable of capturing the additional data behind the AV 1310 relative to the AV's 1310 direction of travel. In an embodiment, as the AV 1310 traverses the onramp, the computer processors 1330 rotate the third sensor's 1313 FOV to be oriented towards the rear of the AV 1310 while also extending the third sensor 1313 upwards and/or to the left of the AV 1310 relative to the AV's 1310 direction of travel. This can allow the third sensor 1313 to detect other vehicles and/or objects that may be approaching the AV 1310 rapidly from the rear and/or provide additional object detection coverage to supplement other sensors that may have a FOV oriented to the rear of the AV 1310.

In an embodiment, if the computer processors 1330 determine that at least one of the sensors 1311, 1312, 1313 is experiencing a partially or fully occluded FOV (e.g., due to a large truck and/or object), the computer processors 1330 cause the third sensor 1313 to move such that the third sensor 1313 is capable of capturing sensor data beyond the occluded view. For instance, if a large truck is driving in front of the AV 1310 and blocking the FOV of the second sensor 1312, the computer processors 1330 can cause the third sensor 1313 to extend and/or rotate such that the third sensor 1313 is capable of capturing sensor data at locations beyond the large truck. In an embodiment, if the computer processors 1330 determine that the AV 1310 is operating in high traffic conditions (e.g., roadway LOS with a grade of D and/or below), the computer processors 1330 cause the third sensor 1313 to extend and/or rotate such that the third sensor 1313 is capable of capturing sensor data at locations of potential blind spots associated with the AV 1310. For example, in an embodiment, the computer processors 1330 rotate and extend the third sensor 1313 such that the third sensor's 1313 FOV is oriented substantially along the first side (1S) of the AV 1310 towards the second end (2E) of the AV 1310. Thus, the third sensor 1313 can detect other vehicles proximate to the AV 1310 in locations that may be subject to an increased probability of being damaged (e.g., from being sideswiped, rear-ended, etc.) during high traffic conditions due to, for example, other vehicles being in close proximity to the AV 1310.

At block 1660, the computer processors 1330 carry out operations to determine if at least one of the sensors 1311, 1312, 1313 is capable of capturing additional data based on their current electronic configuration.

At block 1670, the computer processors 1330 carry out operations to adjust at least one electronic function of at least one of the sensors 1311, 1312, 1313 such that at least one of the sensors 1311, 1312, 1313 is capable of capturing the additional data. In an embodiment, adjusting at least one electronic function includes increasing/decreasing the sensor's scan rate, increasing/decreasing the sensor's digital zoom, increasing/decreasing the sensor's beam power, increasing/decreasing the sensor's pixel resolution, and/or increasing/decreasing the sensor's beam width. In an embodiment, when the AV 1310 is operating in high traffic conditions, the computer processors 1330 determine that an increase in object detection accuracy is desirable and can increase the scan rate and/or pixel resolution of one or more of the sensors 1311, 1312, 1313.

At block 1680, the computer processors 1330 carry out operations to transmit sensor data captured by the third sensor 1313 (or other movable sensors) to one or more remote vehicle systems. In an embodiment, the computer processors 1330 transmit data captured by the third sensor 1313 to the remotely located database 134 as described earlier with reference to FIG. 1. Other AV systems can access the stored data from the remotely located database 134. In an embodiment, the computer processors 1330 are communicatively coupled directly with other AV systems for transmitting the data captured by the third sensor 1313.

Figure 17:
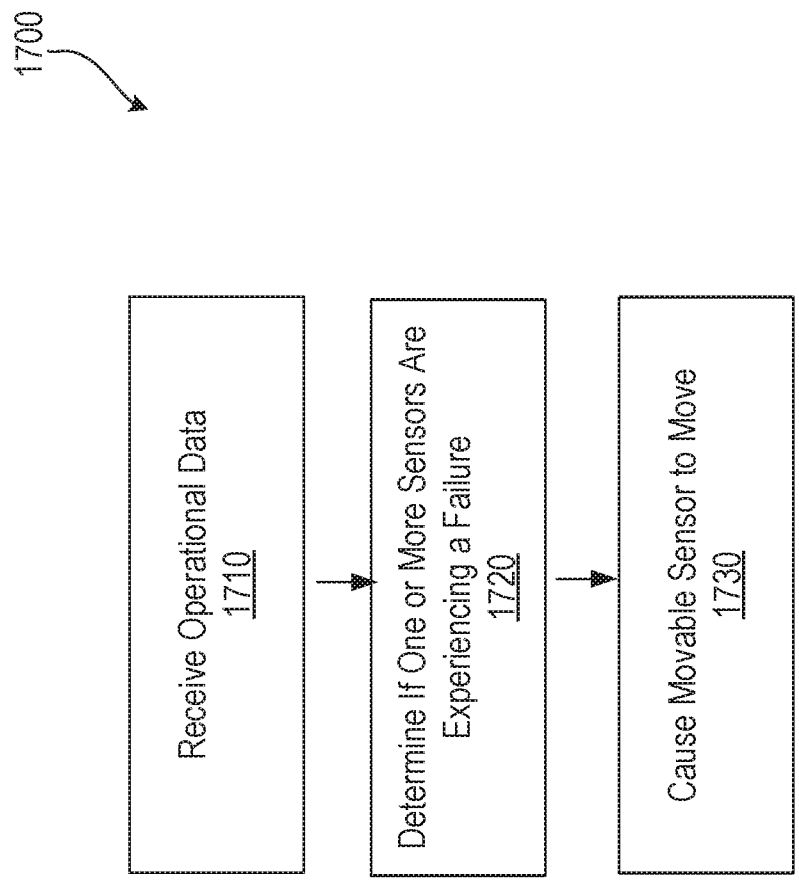
FIG. 17 is a flowchart depicting a method for improving vehicle operations by using movable sensors to supplement at least one failing sensor, according to one or more embodiments of the present disclosure.

FIG. 17 is a flowchart depicting a method 1700 for improving vehicle operations by using movable sensors to supplement at least one failing sensor, according to one or more embodiments of the present disclosure. The method 1700 can be performed alongside the method 1600 discussed previously with reference to FIG. 16, or the method 1700 can be performed separately. For illustrative purposes, the method 1700 is described as being performed by the system 1300 discussed previously with reference to FIG. 13. The method 1700 includes receiving operational data (block 1710), determining if one or more sensors are experiencing a failure (block 1720), and causing a movable sensor to move (block 1730).

At block 1710 the computer processors 1330 carry out operations to receive operational data associated with at least one of the sensors 1311, 1312, 1313.

At block 1720, the computer processors 1330 carry out operations to determine, based on the received operational data, if the first sensor 1311 and/or second sensor 1312 are experiencing a failure condition. A failure condition can be partial or full. A full failure can indicate that one of the sensors 1311, 1312 has become completely inoperable due to damage. A partial failure can indicate that one of the sensors 1311, 1312 has become partially inoperable and/or de-calibrated.

At block 1730, the computer processors 1330 carry out operations to cause the third sensor 1313 to move based on the determining that the first and/or second sensors 1311, 1312 are experiencing a failure. In an embodiment, if the operational data indicates that the first sensor 1311 and/or the second sensor 1312 is experiencing a failure condition (e.g., the first and/or second sensor 1311, 1312 has become inoperable, damaged, de-calibrated, etc.), the computer processors 1330 cause the third sensor 1313 to extend and/or rotate such that the third sensor's 1313 FOV is oriented to provide at least partial coverage of the FOV associated with the sensor experiencing a failure condition. In an embodiment, if the second sensor 1312 becomes damaged and/or inoperable, the computer processors 1330 cause the third sensor 1313 to extend/ and/or rotate such that the third sensor's 1313 FOV can supplement the second sensor's 1312 FOV.

ADDITIONAL EMBODIMENTS

In some embodiments, data is received associated with an environment in which a vehicle is operating. The vehicle includes multiple sensors. The sensors include at least one movable sensor configured to move in at least one direction. Based on the received data, a context of the vehicle is determined. Based on the context of the vehicle, it is determined that additional data is to be captured. It is determined whether the at least one movable sensor is capable of capturing the additional data based on a current mechanical configuration of the at least one movable sensor. Based on a determination that the at least one movable sensor is unable to capture the additional data in the current mechanical configuration, the at least one movable sensor is caused to move in at least one direction such that the at least one movable sensor is able to capture the additional data.

In some embodiments, the received data is object detection data from at least one sensor of the plurality of sensors indicating that the at least one sensor has an at least partially occluded field of view, the method comprising causing the at least one movable sensor to move in at least one direction such that the at least one sensor is capable of capturing sensor data beyond the at least partially occluded field of view.

In some embodiments, the received data indicates a high level of road traffic proximate to the vehicle. The at least one movable sensor is caused to move in at least one direction such that the at least one movable sensor is capable of capturing sensor data of at least one blind spot of the vehicle.

In some embodiments, it is determined whether at least one sensor is able to capture the additional data based on a current electronic configuration of the at least one sensor. Based on a determination that the at least one sensor is unable to capture the additional data in the current electronic configuration, an electronic function of the at least one sensor is adjusted such that the at least one movable sensor is able to capture the additional data.

In some embodiments, operational data is received associated with at least one sensor of the plurality of sensors. Based on the received operational data, the at least one movable sensor is caused to move in at least one direction.

In some embodiments, the operational data indicates that the at least one sensor is experiencing a failure condition. The at least one movable sensor is caused to move in at least one direction such that the at least one movable sensor is capable of capturing sensor data of a field of view of the at least one sensor.

In some embodiments, causing the at least one movable sensor to move includes causing the at least one movable sensor to extend in a direction, rotate in a direction about an axis of rotation, or both.

In some embodiments, determining that additional data is to be captured includes determining a probability that additional data useful for vehicle navigation purposes is available in an orientation outside a current view of the at least one movable sensor.

What is claimed is:

1. A vehicle comprising:
   a plurality of sensors, the plurality of sensors comprising at least one movable sensor configured to:
      move in at least one direction, and
      capture sensor data;
   a computer-readable medium comprising computer-executable instructions; and
   at least one processor communicatively coupled to the plurality of sensors, including the at least one movable sensor, and configured to execute the computer-executable instructions to:
      receive data associated with an environment in which the vehicle is operating;
      determine, based on the received data, a context of the vehicle, including identifying that the context is that the vehicle is traversing a highway onramp;
      in response to determining that the vehicle is traversing the highway onramp, cause the at least one movable sensor to move in a direction such that the at least one movable sensor is capable of capturing sensor data at locations opposite a direction of traverse of the vehicle;
      determine, based on the context of the vehicle, that additional data is to be captured;
      determine if the at least one movable sensor is capable of capturing the additional data based on a current mechanical configuration of the at least one movable sensor; and
      cause, based on a determination that the at least one movable sensor is unable to capture the additional data in the current mechanical configuration, the at least one movable sensor to move in a direction such that the at least one movable sensor is able to capture the additional data at locations opposite a direction of traverse of the vehicle, including rotating the at least one movable sensor and orienting a field of view of the at least one movable sensor toward a rear of the vehicle, wherein the at least one movable sensor is configurable to stay within predefined heights relative to the vehicle, and wherein the predefined heights include user-selectable configurations of at least one of a minimum height, a maximum height, or a range of heights.

2. The vehicle of claim 1, wherein the at least one movable sensor is mounted on an aerial platform, the aerial platform being geographically tethered to the vehicle.

3. The vehicle of claim 1, wherein the at least one processor, when executing the computer-executable instructions, is further configured to carry out operations to transmit the sensor data captured by the at least one movable sensor to at least one remote vehicle system.

4. The vehicle of claim 1, wherein the received data is geographical data from a global positioning system.

5. The vehicle of claim 1, wherein, when the vehicle is traversing a road and the received data indicates that the vehicle is approaching at least one turn in the road, the at least one processor is configured to carry out operations to cause the at least one movable sensor to move in a direction such that the at least one movable sensor is capable of capturing the sensor data at locations that are distinct from a location of the at least one turn in the road.

6. The vehicle of claim 1, wherein when the received data is object detection data from at least one movable sensor of the plurality of sensors indicating that the at least one movable sensor has an at least partially occluded field of view, the at least one processor is configured to carry out operations to cause the at least one movable sensor to move in a direction such that the at least one movable sensor is capable of capturing the sensor data beyond the at least partially occluded field of view.

7. The vehicle of claim 1, wherein when the received data indicates that road traffic proximate to the vehicle is at a traffic level exceeding a predetermined traffic threshold, the at least one processor is configured to carry out operations to cause the at least one movable sensor to move in a direction such that the at least one movable sensor is capable of capturing the sensor data of at least one blind spot of the vehicle.

8. The vehicle of claim 1, wherein, when executing the computer-executable instructions, the at least one processor is configured to further carry out operations to:
   determine if at least one movable sensor of the plurality of sensors is capable of capturing the additional data based on a current electronic configuration of the at least one movable sensor; and
   adjust, based on a determination that the at least one movable sensor is unable to capture the additional data in the current mechanical configuration, an electronic function of the at least one movable sensor such that the at least one movable sensor is able to capture the additional data.

9. The vehicle of claim 1, wherein, when executing the computer-executable instructions, the at least one processor further carries out operations to:
   receive operational data associated with at least one movable sensor of the plurality of sensors; and
   cause, based on the received operational data, the at least one movable sensor to move in the direction.

10. The vehicle of claim 9, wherein, when the operational data indicates that the at least one movable sensor is experiencing a failure condition, the at least one processor is configured to carry out operations to cause the at least one movable sensor to move in a direction such that the at least one movable sensor is capable of capturing the sensor data in a field of view of the at least one movable sensor.

11. The vehicle of claim 1, wherein causing the at least one movable sensor to move comprises causing the at least one movable sensor to extend in the direction, rotate in the direction about an axis of rotation, or both.

12. The vehicle of claim 1, wherein determining that the additional data is to be captured comprises determining a probability that the additional data useful for vehicle navigation purposes is available in an orientation outside a current view of the at least one movable sensor.

13. A method comprising:
   receiving data associated with an environment in which a vehicle is operating, the vehicle comprising a plurality of sensors, the plurality of sensors comprising at least one movable sensor configured to move in at least one direction;
   determining, based on the received data, a context of the vehicle, including identifying a high traffic context in which other vehicles are or will be proximate to the vehicle during high-traffic conditions in locations subject to an increased probability of being damaged;
   in response to determining that the context is the high traffic context, causing the at least one movable sensor to move in a direction such that the at least one movable sensor is capable of capturing sensor data at locations along sides of the vehicle in a direction of traverse of the vehicle;
   determining, based on the context of the vehicle, that additional data is to be captured;
   determining if the at least one movable sensor is capable of capturing the additional data based on a current mechanical configuration of the at least one movable sensor; and
   causing, based on a determination that the at least one movable sensor is unable to capture the additional data in the current mechanical configuration, the at least one movable sensor to move in the at least one direction such that the at least one movable sensor is able to capture the additional data at locations along sides of the vehicle in a direction of traverse of the vehicle, including rotating the at least one movable sensor and orienting a field of view of the at least one movable sensor toward the locations along the sides of the vehicle in the direction of traverse of the vehicle at predefined heights relative to the vehicle, and wherein the predefined heights include user-selectable configurations of at least one of a minimum height, a maximum height, or a range of heights.

14. The method of claim 13, wherein the at least one movable sensor is mounted on an aerial platform, the method further comprising geographically tethering the aerial platform to the vehicle.

15. The method of claim 13, further comprising transmitting the additional data captured by the at least one movable sensor to at least one remote vehicle system.

16. The method of claim 13, wherein the received data is geographical data from a global positioning system.

17. The method of claim 13, wherein the received data indicates the vehicle is approaching at least one turn in a road that the vehicle is traversing, the method comprising causing the at least one movable sensor to move in at least one direction such that the at least one movable sensor is capable of capturing the sensor data at locations that are distinct from a location of the at least one turn in the road.

18. The method of claim 13, wherein the received data indicates that the vehicle is traversing an interstate onramp, the method comprising causing the at least one movable sensor to move in the at least one direction such that the at least one movable sensor is capable of capturing the sensor data at locations opposite the vehicle's direction of traverse.

19. The method of claim 13, wherein the increased probability of being damaged includes a probability of one or more of the vehicle being sideswiped or rear-ended.

20. One or more non-transitory computer readable storage media storing instructions which, when executed by one or more computing devices, cause the one or more computing devices to:
   receive data associated with an environment in which a vehicle is operating, the vehicle comprising a plurality of sensors, the plurality of sensors comprising at least one movable sensor configured to move in at least one direction;
   determine, based on the received data, a context of the vehicle, including identifying that the context is that the vehicle is traversing a highway onramp;
   in response to determining that the vehicle is traversing the highway onramp, cause the at least one movable sensor to move in a direction such that the at least one movable sensor is capable of capturing sensor data at locations opposite a direction of traverse of the vehicle;

determine, based on the context of the vehicle, that additional data is to be captured;

determine if the at least one movable sensor is capable of capturing the additional data based on a current mechanical configuration of the at least one movable sensor; and cause, based on a determination that the at least one movable sensor is unable to capture the additional data in the current mechanical configuration, the at least one movable sensor to move in the at least one direction such that the at least one movable sensor is able to capture the additional data, wherein the at least one movable sensor is configurable to stay within predefined heights relative to the vehicle, and wherein the predefined heights include user-selectable configurations of at least one of a minimum height, a maximum height, or a range of heights.

\* \* \* \* \*